(12) United States Patent
Huffman et al.

(10) Patent No.: US 11,580,286 B2
(45) Date of Patent: Feb. 14, 2023

(54) ELECTRONIC GENERATION OF THREE-DIMENSIONAL QUANTUM CIRCUIT DIAGRAMS

(71) Applicant: International Business Machines Corporation, Armonk, NY (US)

(72) Inventors: Joel Russell Huffman, Austin, TX (US); Asier Arranz Jimenez, Barakaldo (ES)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 17/180,276

(22) Filed: Feb. 19, 2021

(65) Prior Publication Data

US 2022/0222412 A1 Jul. 14, 2022

(30) Foreign Application Priority Data

Jan. 13, 2021 (EP) ..................................... 21382011

(51) Int. Cl.
*G06F 30/392* (2020.01)
*G06N 10/00* (2022.01)
(Continued)

(52) U.S. Cl.
CPC ........... *G06F 30/392* (2020.01); *G06N 10/00* (2019.01); *G06T 15/00* (2013.01); *G06T 19/20* (2013.01); *G06T 2219/2016* (2013.01)

(58) Field of Classification Search
CPC ....... G06F 30/392; G06N 10/00; G06T 15/00; G06T 19/20; G06T 2219/2016
See application file for complete search history.

(56) References Cited

U.S. PATENT DOCUMENTS 9,858,531 B1 1/2018 Monroe et al.
10,332,024 B2 6/2019 Sheer et al.
(Continued)

FOREIGN PATENT DOCUMENTS

CN 110968943 4/2020
WO 2019064054 4/2019
WO 2020074230 4/2020

OTHER PUBLICATIONS

Zhang et al. "Semiconductor quantum computation", 2019, Oxford University (Year: 2019).*
(Continued)

*Primary Examiner* — YuJang Tswei
(74) *Attorney, Agent, or Firm* — Amin, Turocy & Watson, LLP

(57) ABSTRACT

Systems and techniques that facilitate electronic generation of three-dimensional quantum circuit diagrams are provided. In various embodiments, a system can comprise a data component that can access qubit topology data characterizing a quantum computing device. In various aspects, the system can further comprise a rendering component that can render a three-dimensional quantum circuit diagram based on the qubit topology data. In various instances, the qubit topology data can indicate which qubits of the quantum computing device are coupled together. In various cases, the rendering component can render the three-dimensional quantum circuit diagram by generating a two-dimensional qubit configuration model of the quantum computing device based on which qubits of the quantum computing device are coupled together, by extruding one or more qubit lines three-dimensionally outward from the two-dimensional qubit configuration model, and by rendering one or more quantum gates on the one or more qubit lines.

17 Claims, 16 Drawing Sheets

(51) Int. Cl.
  *G06T 19/20* (2011.01)
  *G06T 15/00* (2011.01)

(56) References Cited

U.S. PATENT DOCUMENTS

| | | | |
|---|---|---|---|
| 10,562,764 | B2 | 2/2020 | Leipold et al. |
| 10,592,626 | B1 | 3/2020 | Pednault et al. |
| 2018/0240035 | A1* | 8/2018 | Scheer ............... H01L 39/223 |
| 2019/0007051 | A1* | 1/2019 | Sete ................. H03K 19/195 |

OTHER PUBLICATIONS

Li, et al., "One-dimensional quantum computing with a 'segmented chain' is feasible with today's gate fidelities", 2018, The University of New South Wales (Year: 2018).*

Hanks, "Effective Compression of Quantum Braided Circuits Aided by ZX-Calculus", 2020, American Physical Society (Year: 2020).*

Mell et al., "The NIST Definition of Cloud Computing," Recommendations of the National Institute of Standards and Technology, NIST Special Publication 800-145, Sep. 2011, 7 pages.

Farghadan et al., "Mapping quantum circuits on 3D nearest-neighbor architectures," Quantum Science and Technology, 2019, 13 pages.

Arranz, "The art behind a quantum circuit," https://medium.com/@asierarranz/the-art-behind-a-quantum-circuit-1fa0c530da3e, 7 pages.

Blumoff, "Multiqubit experiments in 3D circuit quantum electrodynamics," Dissertation presented to the faculty of the graduate school of Yale University, 2017, 230 pages.

Sidney, "A Slightly Larger S Gate," Algorithmic Assertions, https://algassert.com/post/1804, 2018, 7 pages.

Marks et al., "QTop," https://github.com/jacobmarks/QTop, Version 0.3, 2017, 10 pages.

Asai et al., "Compaction of Topological Quantum Circuits by Modularization," IEICE Transactions on Fundamentals of Electronics Communications and Computer Sciences, 2019, 3 pages.

Gidney et al., "Efficient magic state factories with a catalyzed |CCZ> to 2|T> transformation," arXiv:1812.01238v3 [quant-ph], 2019, 24 pages.

Gidney, "Quantum publised my paper on catalyzed distilattion" https://twitter.com/craiggidney/status/1123061273837461505 accessed Feb. 19, 2021.

* cited by examiner

ELECTRONIC GENERATION OF THREE-DIMENSIONAL QUANTUM CIRCUIT DIAGRAMS

BACKGROUND

The subject disclosure relates to quantum circuit diagrams, and more specifically to electronic generation of three-dimensional quantum circuit diagrams.

A quantum computing device can utilize one or more qubits to perform quantum information processing. Quantum information processing is accomplished by executing one or more quantum circuits on the one or more qubits of the quantum computing device. A quantum circuit is a string of quantum gates that can be executed in series and/or in parallel to transform the states of the one or more qubits of the quantum computing device. A quantum circuit can be visually illustrated by a quantum circuit diagram.

Conventionally, a quantum circuit diagram depicts a column on a left side of the quantum circuit diagram that lists the one or more qubits that comprise the quantum computing device. Moreover, the quantum circuit diagram depicts a qubit line extending rightward from each qubit in the column of qubits. Furthermore, the quantum circuit diagram depicts representations of quantum gates along the qubit lines, where execution is performed from left to right. Thus, the quantum circuit diagram allows a viewer (e.g., an operator, a scientist, an engineer, an analyst) to visually see which quantum gates are applied to which qubits of the quantum computing device in which execution order. In other words, the quantum circuit diagram visually represents quantum software that is executable on the quantum computing device.

A technical problem that plagues such a conventional quantum circuit diagram is that such a conventional quantum circuit diagram is wholly disconnected from the physical configuration of the quantum computing device. In other words, such a conventional quantum circuit diagram does not in any way visually represent and/or otherwise convey information about the underlying qubit topology of the quantum computing device (e.g., does not indicate how the one or more qubits of the quantum computing device are coupled together). This is problematic because the underlying qubit topology of the quantum computing device can limit how quantum circuits are executed on the quantum computing device. For instance, two qubits cannot be entangled via a CNOT gate unless they are coupled together, but a conventional quantum circuit diagram does not convey which qubits are coupled together and which are not. Thus, although such a conventional quantum circuit diagram may indicate which quantum gates are applied to which qubits in which execution order, such a conventional quantum circuit diagram lacks information about the underlying qubit topology of the quantum computing device, which deprives viewers of a deeper level of understanding of the quantum computing device.

Systems and/or techniques that can ameliorate one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate electronic generation of three-dimensional quantum circuit diagrams are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a data component that can access qubit topology data characterizing a quantum computing device. In various aspects, the computer-executable components can further comprise a rendering component that can render a three-dimensional quantum circuit diagram based on the qubit topology data. In various instances, the qubit topology data can indicate which qubits of the quantum computing device are coupled together. In various cases, the rendering component can render the three-dimensional quantum circuit diagram by generating a two-dimensional qubit configuration model of the quantum computing device based on which qubits of the quantum computing device are coupled together. In various aspects, the rendering component can further render the three-dimensional quantum circuit diagram by extruding one or more qubit lines three-dimensionally outward from the two-dimensional qubit configuration model. In various instances, the rendering component can further render the three-dimensional quantum circuit diagram by rendering one or more quantum gates on the one or more qubit lines. In various cases, relative positions of the quantum gates along the one or more qubit lines indicate an order of execution of the one or more quantum gates.

According to one or more embodiments, the above-described system can be implemented as a computer-implemented method and/or computer program product.

DETAILED DESCRIPTION

Figure 1:
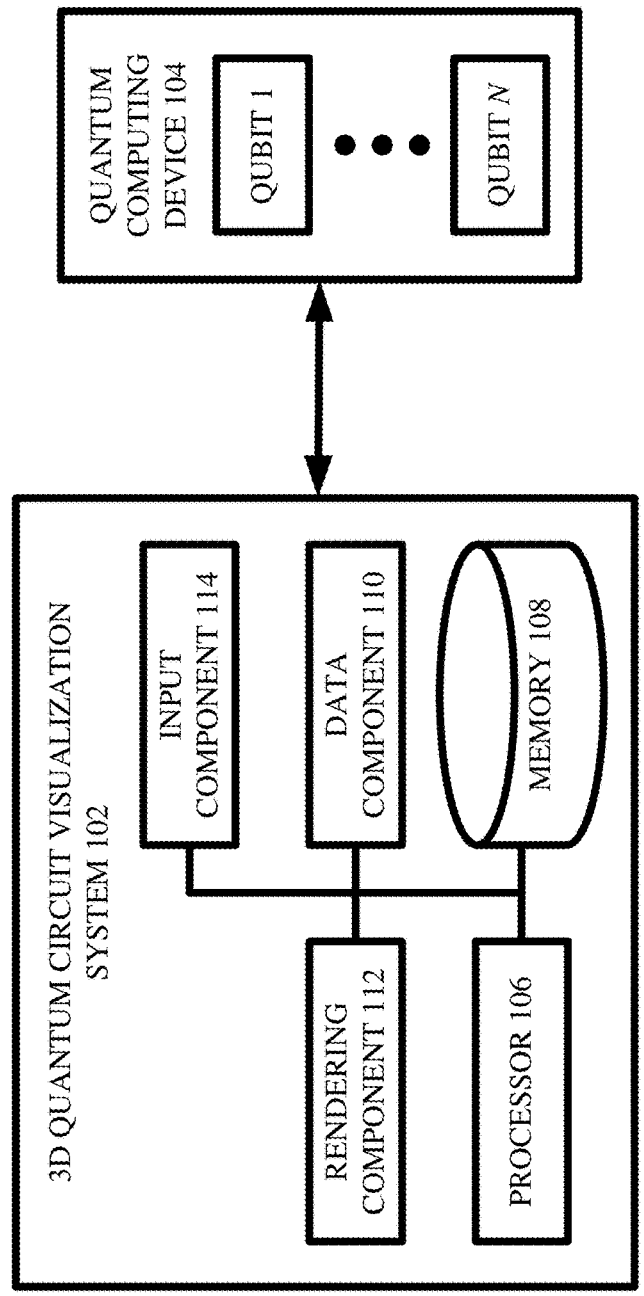
FIG. 1 illustrates a block diagram of an example, non-limiting system that facilitates electronic generation of three-dimensional quantum circuit diagrams in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, a quantum computing device can utilize one or more qubits to perform quantum information processing, which can involve executing one or more quantum circuits on the one or more qubits of the quantum computing device. A quantum circuit can be a string of quantum gates that can be executed in series and/or in parallel to mathematically transform the states of the one or more qubits of the quantum computing device. Non-limiting examples of such quantum gates can include single-qubit gates such as Pauli-X gates (e.g., denoted as X), Pauli-Y gates (e.g., denoted as Y), Pauli-Z gates (e.g., denoted as Z), Hadamard gates (e.g., denoted as H), and/or Phase gates (e.g., denoted as S or P), as well as entangling gates such as Controlled Not gates (e.g., denoted as CNOT), Controlled Z gates (e.g., denoted CZ), Toffoli gates (e.g., denoted CCNOT or TOFF), and/or SWAP gates.

A quantum circuit can be visually represented by a quantum circuit diagram. As mentioned above, a quantum circuit diagram conventionally illustrates a list and/or column of qubits on a left side of the quantum circuit diagram, illustrates a qubit line extending rightward from each qubit in the list and/or column, and illustrates quantum gates on and/or otherwise along the qubit lines. If a particular quantum gate is illustrated on the qubit line of a particular qubit, this can be read as indicating that the particular quantum gate operates on and/or otherwise utilizes the state of the particular qubit. As explained above, a quantum circuit diagram can be read from left to right, such that a given quantum gate is executed after any quantum gates that are leftward of the given quantum gate, and such that the given quantum gate is executed before any quantum gates that are rightward of the given quantum gate. Accordingly, a quantum circuit diagram allows a viewer (e.g., an operator, a scientist, an engineer, an analyst) to visually see which quantum gates are applied to which qubits of the quantum computing device in which execution order. In other words, a quantum circuit diagram visually represents quantum software that is executable on a quantum computing device.

A technical problem that afflicts such a conventional quantum circuit diagram is that such a conventional quantum circuit diagram does not convey in any way information about the underlying qubit topology of the quantum computing device on which the depicted quantum circuit is executable. That is, such a conventional quantum circuit diagram does not indicate which qubits of the quantum computing device (e.g., which qubits that are in the left-most list and/or column of the quantum circuit diagram) are coupled together and which qubits are not coupled together. This is problematic because the underlying qubit topology of the quantum computing device can limit how quantum circuits are executed on the quantum computing device. For example, two qubits cannot be entangled via a CNOT gate unless they are coupled together. A conventional quantum circuit diagram merely lists the qubits of the quantum computing device in a single-file column and does not convey which qubits are coupled together and which are not. This can yield confusing results where two qubits are listed adjacently in the column of the quantum circuit diagram and yet are not actually coupled in the quantum computing device. Likewise, the converse and equally-confusing result can also occur, where two qubits are listed non-adjacently in the column of the quantum circuit diagram and yet are actually coupled together in the quantum computing device. Accordingly, a viewer that is reading and/or editing the conventional quantum circuit diagram is not apprised of the underlying qubit topology and thus can be unaware of which qubits are able to be entangled and which are not. In other words, such a conventional quantum circuit diagram leaves a gaping disconnect between the depicted quantum software and the underlying quantum hardware on which the depicted quantum software is executed. Systems and/or techniques that can ameliorate one or more of these technical problems can be desirable.

Various embodiments of the invention can address one or more of these technical problems. Specifically, various embodiments of the invention can provide systems and/or techniques that can facilitate electronic generation of three-dimensional quantum circuit diagrams. In various aspects, the inventors of various embodiments of the invention recognized that a reason that conventional quantum circuit diagrams fail to convey information about underlying qubit topologies is that conventional quantum circuit diagrams are two-dimensional. Specifically, the inventors of various embodiments of the invention recognized that a two-dimensional quantum circuit diagram illustrates qubit identities along a first dimension (e.g., the column of qubits that are in the quantum computing device extends in an up-down direction of the quantum circuit diagram) and illustrates time and/or order of execution along a second dimension (e.g., the qubit lines, on which quantum gates are illustrated, extend in a left-right direction of the quantum circuit diagram). Thus, while a two-dimensional quantum circuit diagram indicates which quantum gates are executed on which qubits of the quantum computing device in which execution order, a two-dimensional quantum circuit diagram includes no information whatsoever that identifies which qubits of the quantum computing diagram are coupled together. The inventors of various embodiments of the invention recognized that including a third dimension in a quantum circuit diagram can allow information about the underlying qubit topology to be visually conveyed and/or otherwise visually represented.

Various embodiments of the invention can be considered as a computerized visualization tool (e.g., an interactive graphical user interface) that can electronically render on an electronic display (e.g., a computer screen/monitor) a three-dimensional quantum circuit diagram.

In various aspects, such a computerized visualization tool can electronically receive and/or otherwise electronically access from any suitable data structure qubit topology information that characterizes a quantum computing device. For instance, the quantum computing device can be and/or include any suitable quantum substrate on which are formed a set of qubits (e.g., one or more qubits). Accordingly, the qubit topology information can identify a connectivity mapping of the set of qubits. That is, the qubit topology information can indicate which qubits in the set of qubits are physically coupled together on the quantum computing device (e.g., the qubit topology information can specify coupled pairs of qubits).

In various instances, such a computerized visualization tool can electronically generate a two-dimensional qubit configuration model based on the qubit topology information. In other words, the computerized visualization tool can electronically create a two-dimensional computerized rendition of the set of qubits that are formed on the quantum computing device based on the qubit topology information. For example, suppose that the qubit topology information indicates that a qubit A is coupled to a qubit B, that the qubit B is coupled to a qubit C, and that the qubit B is also coupled to a qubit D. In such case, the computerized visualization tool can electronically render a symbol that represents the qubit A, a symbol that represents the qubit B, a symbol that represents the qubit C, and a symbol that represents the qubit D. Moreover, the computerized visualization tool can electronically render a bridge and/or other coupling symbol between the symbol representing the qubit A and the symbol representing the qubit B, thereby illustrating that the qubit A is coupled to the qubit B. Similarly, the computerized visualization tool can electronically render a bridge and/or other coupling symbol between the symbol representing the qubit B and the symbol representing the qubit C, thereby illustrating that the qubit B is coupled to the qubit C. Likewise, the computerized visualization tool can electronically render a bridge and/or other coupling symbol between the symbol representing the qubit B and the symbol representing the qubit D, thereby illustrating that the qubit B is coupled to the qubit D. Thus, the result can be a two-dimensional electronic rendition (e.g., an image displayed on a computer screen/monitor) of the set of qubits of the quantum computing device that shows which qubits are coupled together. Such a rendition can be referred to as the two-dimensional qubit configuration model.

In some cases, the two-dimensional qubit configuration model can depict the physical qubit arrangement of the quantum computing device. That is, the two-dimensional qubit configuration model can illustrate in a scaled manner how the set of qubits are actually arranged and/or located on the quantum computing device. In such cases, the two-dimensional qubit configuration model can be considered as an aerial view of the set of qubits of the quantum computing device. In other cases, the two-dimensional qubit configuration model can refrain from depicting the actual physical arrangement of the set of qubits of the quantum computing device (e.g., can be not drawn to scale), but can nevertheless illustrate the connectivity and/or topology of the set of qubits. In such cases, the two-dimensional qubit configuration model can be considered as not an exact aerial view of the set of qubits of the quantum computing device, but can still be topologically equivalent to the set of qubits of the quantum computing device.

In various aspects, the computerized visualization tool can electronically access from any suitable data structure quantum circuit information associated with the quantum computing device. For instance, it can be desired to execute a particular quantum circuit on the quantum computing device. Accordingly, the quantum circuit information can identify the particular quantum circuit. In other words, the quantum circuit information can indicate which specific quantum gates make up the particular quantum circuit, can indicate which qubits of the quantum computing device such specific quantum gates are to be executed on, and can indicate the chronological order in which such specific quantum gates are to be executed. In various aspects, such quantum circuit information can be electronically generated via any suitable quantum transpiling techniques.

In various instances, the computerized visualization tool can electronically generate a three-dimensional quantum circuit diagram based on the quantum circuit information and based on the two-dimensional qubit configuration model. Specifically, the computerized visualization tool can electronically render the two-dimensional qubit configuration model in three-space. In other words, the computerized visualization tool can electronically import the two-dimensional qubit configuration model into a three-dimensional graphing space. In such case, the two-dimensional qubit configuration model can be considered as lying within a plane of the three-dimensional graphing space. In various aspects, the computerized visualization tool can electronically extrude a qubit line three-dimensionally outward from each of the qubits depicted in the two-dimensional qubit configuration model. That is, the computerized visualization tool can electronically draw qubit lines that extend out of the plane in which the two-dimensional qubit configuration model lies. For example, suppose that the two-dimensional qubit configuration model lies in the x-y plane. In some cases, the qubit lines can extend orthogonally out of the x-y plane along the z-axis. In other cases, the qubit lines can extend non-orthogonally out of the x-y plane in any suitable direction (e.g., the qubit lines can be non-parallel with the z-axis and can be non-parallel with the x-y plane).

Once the qubit lines are three-dimensionally extruded out of the two-dimensional qubit configuration model, the computerized visualization tool can electronically illustrate quantum gates on the qubit lines, in accordance with the quantum circuit information. That is, the computerized visualization tool can illustrate symbols (e.g., two-dimensional and/or three-dimensional symbols) at various positions along the three-dimensionally extruded qubit lines, which symbols correspond to and/or otherwise represent the quantum gates that are specified by the quantum circuit information. In such cases, the qubit lines can be considered as timelines and/or time-axes which indicate order of execution.

For instance, suppose that the quantum circuit information specifies that an H gate is executed on a qubit A and that a Y gate is executed on a qubit B after the S gate is executed on the qubit A. In such case, a symbol representing the qubit A and a symbol representing the qubit B can be illustrated in the two-dimensional qubit configuration model, a qubit line can be extruded three-dimensionally outward from the symbol representing the qubit A, and a different qubit line can be extruded three-dimensionally outward from the symbol representing the qubit B (e.g., the qubit line of the qubit A can be parallel with the qubit line of the qubit B). Moreover, a symbol representing an H gate can be drawn on the qubit line extruded three-dimensionally outward from the symbol representing the qubit A, a symbol representing an S gate can be drawn on the qubit line extruded three-dimensionally outward from the symbol representing the qubit A at some position after and/or downstream from the symbol representing the H gate, and a symbol representing a Y gate can be drawn on the qubit line extruded three-dimensionally outward from the symbol representing the qubit B at some position after and/or downstream from the symbol representing the S gate.

Because such a three-dimensional quantum circuit diagram includes the three-dimensionally extruded qubit lines on which are illustrated symbols of quantum gates, the three-dimensional quantum circuit diagram illustrates which quantum gates are executed on which qubits in which execution order. Moreover, because such a three-dimensional quantum circuit diagram includes the two-dimensional qubit configuration model, the three-dimensional quantum circuit diagram also illustrates the underlying qubit topology of the quantum computing device (e.g., depicts which qubits are coupled together). In other words, the three-dimensional quantum circuit diagram generated by the computerized visualization tool can, in various cases, visually convey quantum software information (e.g., which gates are executed on which qubits in which order) as well as quantum hardware information (e.g., which qubits are coupled together and thus are able to be entangled). Thus, the computerized visualization tool can electronically display three-dimensional quantum circuit diagrams, which can be read by viewers (e.g., operators, scientists, engineers, analysts) and which can accordingly enable the viewers to have a deeper understanding of the quantum computing devices and the quantum circuits that are being analyzed.

Various embodiments of the invention can be employed to use hardware and/or software to solve problems that are highly technical in nature (e.g., to facilitate electronic generation of three-dimensional quantum circuit diagrams), that are not abstract and that cannot be performed as a set of mental acts by a human. Further, some of the processes performed can be performed by a specialized computer (e.g., electronically accessing qubit topology data characterizing a quantum computing device, electronically rendering a three-dimensional quantum circuit diagram based on the qubit topology data, electronically generating a two-dimensional qubit configuration model of the quantum computing device based on which qubits of the quantum computing device are coupled together, extruding one or more qubit lines three-dimensionally outward from the two-dimensional qubit configuration model, and/or rendering one or more quantum gates on the one or more qubit lines). Such defined tasks are not typically performed manually by humans. Moreover, neither the human mind nor a human with pen and paper can electronically access qubit topology data and/or electronically render a three-dimensional quantum circuit diagram by electronically generating a two-dimensional qubit configuration model, by electronically extruding qubit lines three-dimensionally outward from the two-dimensional qubit configuration model, and by electronically rendering qubit gates on the three-dimensionally extruded qubit lines. Instead, various embodiments of the invention are inherently and inextricably tied to computer technology and cannot be implemented outside of a computing environment. Specifically, embodiments of the invention amount to an interactive graphical user interface that can electronically display three-dimensional quantum circuit diagrams so that viewers can gain an improved understanding of how a depicted quantum circuit relates to the underlying qubit topology of the quantum computing device on which the depicted quantum circuit is executable. Such an interactive graphical user interface is an inherently computerized device that cannot be implemented in any practicable and/or sensible way outside of a computing environment.

In various instances, embodiments of the invention can integrate into a practical application the disclosed teachings regarding electronic generation of three-dimensional quantum circuit diagrams. Indeed, as described herein, various embodiments of the invention, which can take the form of systems and/or computer-implemented methods, can be considered as a computerized visualization tool that can electronically access qubit topology information, that can electronically illustrate a two-dimensional qubit configuration model based on the qubit topology information, that can electronically import the two-dimensional qubit configuration model into a three-dimensional graphing space so that qubit lines can be extruded three-dimensionally outward from the two-dimensional qubit configuration model, and that can electronically illustrate quantum gates on the three-dimensionally extruded qubit lines to show an order of execution of the quantum gates. As explained above, conventional quantum circuit diagrams are merely two-dimensional and completely fail to convey any information regarding the underlying qubit topology of the quantum computing device. In stark contrast, embodiments of the invention can electronically display three-dimensional quantum circuit diagrams, which can convey the underlying qubit topology in addition to conveying which quantum gates are executed on which qubits in what order. In other words, various embodiments of the invention can be considered as an improved visualization technique for illustrating quantum circuits (e.g., a three-dimensional quantum circuit diagram can convey more information to a viewer than can a conventional two-dimensional quantum circuit diagram). Because three-dimensional quantum circuit diagrams can convey information concerning underlying qubit topology, which conventional quantum circuit diagrams cannot do, various embodiments of the invention clearly constitute a concrete and tangible technical improvement in the field of quantum circuit diagrams.

Furthermore, various embodiments of the invention can control tangible, hardware-based, and/or software-based devices based on the disclosed teachings. Specifically, embodiments of the invention can visually illustrate on a tangible electronic display (e.g., a tangible computer screen/ monitor) three-dimensional quantum circuit diagrams associated with an underlying quantum computing device. In this way, embodiments of the invention can be considered as a computerized visualization tool that can be used by quantum scientists and/or engineers to perform analysis. In some cases, various embodiments of the invention can control execution of quantum circuits on the quantum computing device (e.g., a three-dimensional quantum circuit can be rendered and/or edited, and the three-dimensional quantum circuit can be actually executed on the quantum computing device).

It should be appreciated that the figures and the herein disclosure describe non-limiting examples of various embodiments of the invention. It should further be appreciated that the figures are not necessarily drawn to scale.

FIG. 1 illustrates a block diagram of an example, non-limiting system 100 that can facilitate electronic generation of three-dimensional quantum circuit diagrams in accordance with one or more embodiments described herein. As shown, there can be a quantum computing device 104. In various aspects, the quantum computing device 104 can comprise any suitable quantum substrate (e.g., silicon wafer) on which are formed a set of qubits (e.g., qubit 1 to qubit n, for any suitable positive integer n). In various instances, the set of qubits can comprise any suitable types of qubits (e.g., superconducting qubits, spin-based qubits, quantum dots) that can be manufactured on the quantum computing device 104 via any suitable nano-fabrication and/or microfabrication techniques (e.g., deposition, etching, angled evaporation, photolithography). In various aspects, the set of qubits of the quantum computing device 104 can exhibit any suitable topology (e.g., connectivity). That is, any suitable pair of qubits in the set of qubits can be coupled together by any suitable interqubit couplers. In various aspects, the quantum computing device 104 can exhibit any suitable physical arrangement of the set of qubits (e.g., qubit 1 to qubit n can be physically positioned and/or located on the quantum computing device 104 in any suitable arrangement and/or pattern).

In various cases, a quantum circuit can be executable on the quantum computing device 104. In various aspects, the quantum circuit can comprise any suitable number of any suitable types of quantum gates that can be executed in series and/or in parallel on the set of qubits of the quantum computing device 104. For instance, the quantum circuit can, as some non-limiting examples, include Pauli-X gates, Pauli-Y gates, Pauli-Z gates, Hadamard gates, Phase gates, CNOT gates, Toffoli gates, and/or SWAP gates. In various aspects, it can be desired to visually represent the quantum circuit, so that a scientist and/or engineer can analyze the quantum circuit prior to actually executing the quantum circuit on the quantum computing device 104. In various cases as described herein, a 3D quantum circuit visualization system 102 (hereinafter referred to as 3DQCV system 102 for sake of brevity) can be any suitable combination of computer hardware and/or computer software that can electronically render a three-dimensional representation of the quantum circuit that is executable on the quantum computing device 104.

In various embodiments, the 3DQCV system 102 can comprise a processor 106 (e.g., computer processing unit, microprocessor) and a computer-readable memory 108 that is operably connected to the processor 106. The memory 108 can store computer-executable instructions which, upon execution by the processor 106, can cause the processor 106 and/or other components of the 3DQCV system 102 (e.g., data component 110, rendering component 112, input component 114) to perform one or more acts. In various embodiments, the memory 108 can store computer-executable components (e.g., data component 110, rendering component 112, input component 114), and the processor 106 can execute the computer-executable components.

In various embodiments, the 3DQCV system 102 can comprise a data component 110. In various aspects, the data component 110 can electronically access from any suitable centralized and/or decentralized data structure (e.g., graph data structure, relational data structure, hybrid data structure, none of which are depicted in FIG. 1) qubit topology data that characterizes and/or otherwise pertains to the quantum computing device 104. In various instances, the qubit topology data can specify a qubit connectivity mapping of the quantum computing device 104. That is, the qubit topology data can indicate which of the set of qubits of the quantum computing device 104 are coupled to each other. In some cases, the qubit topology data can be alphanumeric text that specifies ordered pairs (e.g., 2-tuples) of qubits, such that any two qubits that are physically coupled together on the quantum computing device 104 are listed as an ordered pair. In various aspects, such ordered pairs are a non-limiting example of the qubit topology data, and the qubit topology data can have any other suitable format in various embodiments.

In various embodiments, the 3DQCV system 102 can comprise a rendering component 112. In various aspects, the rendering component 112 can electronically generate a two-dimensional qubit configuration model based on the qubit topology data. In various instances, as mentioned above, the qubit topology data can be alphanumeric text that indicates a qubit connectivity mapping of the quantum computing device 104, and the two-dimensional qubit configuration model can be an electronically rendered, two-dimensional depiction that visually illustrates in shapes rather than mere alphanumeric text the qubit connectivity mapping. In various aspects, the rendering component 112 can electronically draw a qubit symbol for each of the set of qubits of the quantum computing device 104, and the rendering component 112 can electronically draw a coupling symbol between any two qubit symbols which the qubit topology data indicates as being coupled together. More specifically, the rendering component 112 can iterate through every ordered pair of coupled qubits that is identified in the qubit topology data. For each ordered pair of coupled qubits identified in the qubit topology data, the rendering component 112 can electronically illustrate a qubit symbol representing the first qubit in the ordered pair if such a symbol has not already been illustrated, can electronically illustrate a symbol representing the second qubit in the ordered pair if such symbol has not already been illustrated, and can electronically illustrate, between the symbol representing the first qubit and the symbol representing the second qubit, a symbol representing a coupler if such symbol has not already been illustrated. The result can be a two-dimensional pictorial depiction of the qubit topology of the quantum computing device 104, which two-dimensional pictorial depiction can be referred to as the two-dimensional qubit configuration model.

For example, suppose that the qubit topology data specifies that a qubit M is coupled to a qubit N and that the qubit M is also coupled to a qubit O. In such case, the rendering component 112 can electronically render a symbol representing the qubit M, a symbol representing the qubit N, and a symbol representing the qubit O. Moreover, the rendering component 112 can electronically render a symbol representing a coupler, and can position such symbol between the symbol representing the qubit M and the symbol representing the qubit N. Likewise, the rendering component 112 can electronically render a symbol representing a coupler, and can position such symbol between the symbol representing the qubit M and the symbol representing the qubit O.

In various embodiments, the data component 110 can electronically access from any suitable centralized and/or decentralized data structure (e.g., graph data structure, relational data structure, hybrid data structure, none of which are depicted in FIG. 1) quantum circuit data associated with the quantum computing device 104. In various instances, the quantum circuit data can specify (e.g., via alphanumeric text and/or via a conventional quantum circuit diagram) which quantum gates are desired to be executed on which qubits of the quantum computing device 104 in which order. In some cases, the quantum circuit data can be in the form of ordered tuples which identify one or more qubits of the quantum computing device 104, which identify one or more quantum gates to be executed on the one or more qubits, and/or which identify one or more time steps at which such one or more quantum gates are to be executed. In various aspects, such ordered tuples are a non-limiting example of the quantum circuit data, and the quantum circuit data can have any other suitable format in various embodiments.

In various embodiments, the rendering component 112 can electronically render a three-dimensional quantum circuit diagram based on the two-dimensional qubit configuration model and based on the quantum circuit data. In various aspects, the rendering component 112 can electronically import the two-dimensional qubit configuration model into a three-dimensional graphing space, such that the two-dimensional qubit configuration model lies within a plane of the three-dimensional graphing space. In various instances, for each symbol representing a qubit in the two-dimensional qubit configuration model, the rendering component 112 can electronically render a qubit line that extends three-dimensionally out of the plane in which the two-dimensional qubit configuration model lies. In various cases, each qubit line can be orthogonal to the plane in which the two-dimensional qubit configuration model lies. In various other cases, each qubit line can be non-orthogonal to the plane in which the two-dimensional qubit configuration model lies. In various aspects, the rendering component 112 can electronically render on and/or otherwise along the qubit lines symbols that represent quantum gates, based on the quantum circuit data. The result can be a three-dimensional quantum circuit diagram that visually conveys what quantum gates are applied to which qubits of the quantum computing device 104 in which order, in addition to the underlying qubit topology of the quantum computing device 104.

Consider again the above example where the two-dimensional qubit configuration model includes a symbol representing the qubit M, a symbol representing the qubit N, and a symbol representing the qubit O, where the qubit M is coupled to both the qubit N and the qubit O. As explained above, the rendering component 112 can electronically import the two-dimensional qubit configuration model into a three-dimensional graphing space and can thus three-dimensionally extrude a qubit line from the symbol representing the qubit M, a qubit line from the symbol representing the qubit N, and a qubit line from the symbol representing the qubit O. Suppose that the quantum circuit data specifies that a Phase gate is to be executed on the qubit M, that a Pauli-X gate is to be executed on the qubit N after the Phase gate is executed, and that a Pauli-Z gate is to be executed on the qubit O in parallel with the Pauli-X gate. In such case, the rendering component 112 can electronically illustrate a symbol representing a Phase gate at some position along the qubit line extending from the symbol representing the qubit M. Moreover, the rendering component 112 can electronically illustrate a symbol representing a Pauli-X gate at some position along the qubit line extending from the symbol representing the qubit N, such that the symbol representing the Pauli-X gate is downstream from the symbol representing the Phase gate. Furthermore, the rendering component 112 can electronically illustrate a symbol representing a Pauli-Z gate at some position along the qubit line extending from the symbol representing the qubit O, such that the symbol representing the Pauli-Z gate is aligned with (e.g., neither upstream nor downstream from) the symbol representing the Pauli-X gate. The result can be a three-dimensional quantum circuit diagram that visually shows how the qubit M, the qubit N, and the qubit O are coupled and that visually shows which quantum gates are applied in which order to the qubit M, the qubit N, and the qubit O.

In various embodiments, the data component 110 can electronically access from any suitable centralized and/or decentralized data structure (e.g., graph data structure, relational data structure, hybrid data structure, none of which are depicted in FIG. 1) qubit fidelity information that characterizes the set of qubits of the quantum computing device 104. In various aspects, the qubit fidelity information can indicate any suitable properties and/or characteristics of the set of qubits of the quantum computing device 104. For instance, the qubit fidelity information can specify for each qubit in the set of qubits one or more coherence times, one or more operating frequencies, one or more readout errors, one or more single-qubit error rates, and/or one or more entangling error rates. In various cases, the rendering component 112 can electronically alter any suitable visual characteristic of the three-dimensional quantum circuit diagram based on the qubit fidelity information. In various cases, non-limiting examples of such visual characteristics can be shade/hue, font size, and/or line width/thickness. For example, the rendering component 112 can electronically illustrate as red a symbol that represents a qubit having a sufficiently high readout error (e.g., a readout error that exceeds any suitable threshold value), and/or can electronically illustrate as blue a symbol that represents a qubit having a sufficiently low readout error (e.g., a readout error that is below any suitable threshold value). Those having ordinary skill in the art will appreciate that this is merely one non-limiting example of how visual characteristics of the three-dimensional quantum circuit diagram can be altered to indicate and/or otherwise convey data specified by the qubit fidelity information.

In various embodiments, the 3DQCV system 102 can comprise an input component 114. In various aspects, the input component 114 can electronically receive and/or otherwise electronically access input data that is inputted by an operator of the 3DQCV system 102. For example, an operator can interact with the 3DQCV system 102 via any suitable human-computer interface device, such as a keyboard, a keypad, a computer mouse, a joystick, and/or voice command. In various cases, the operator can provide input data to the 3DQCV system 102 via such human-computer interface device. In various aspects, the input data can indicate a particular orientation and/or zoom level of the three-dimensional quantum circuit diagram that the operator desires to view, and the rendering component 112 can electronically alter the orientation and/or the zoom level of the three-dimensional quantum circuit diagram based on the input data. In other words, the rendering component 112 can rotate, translate, magnify, and/or shrink the rendered view of the three-dimensional quantum circuit diagram based on the input data.

Figure 2:
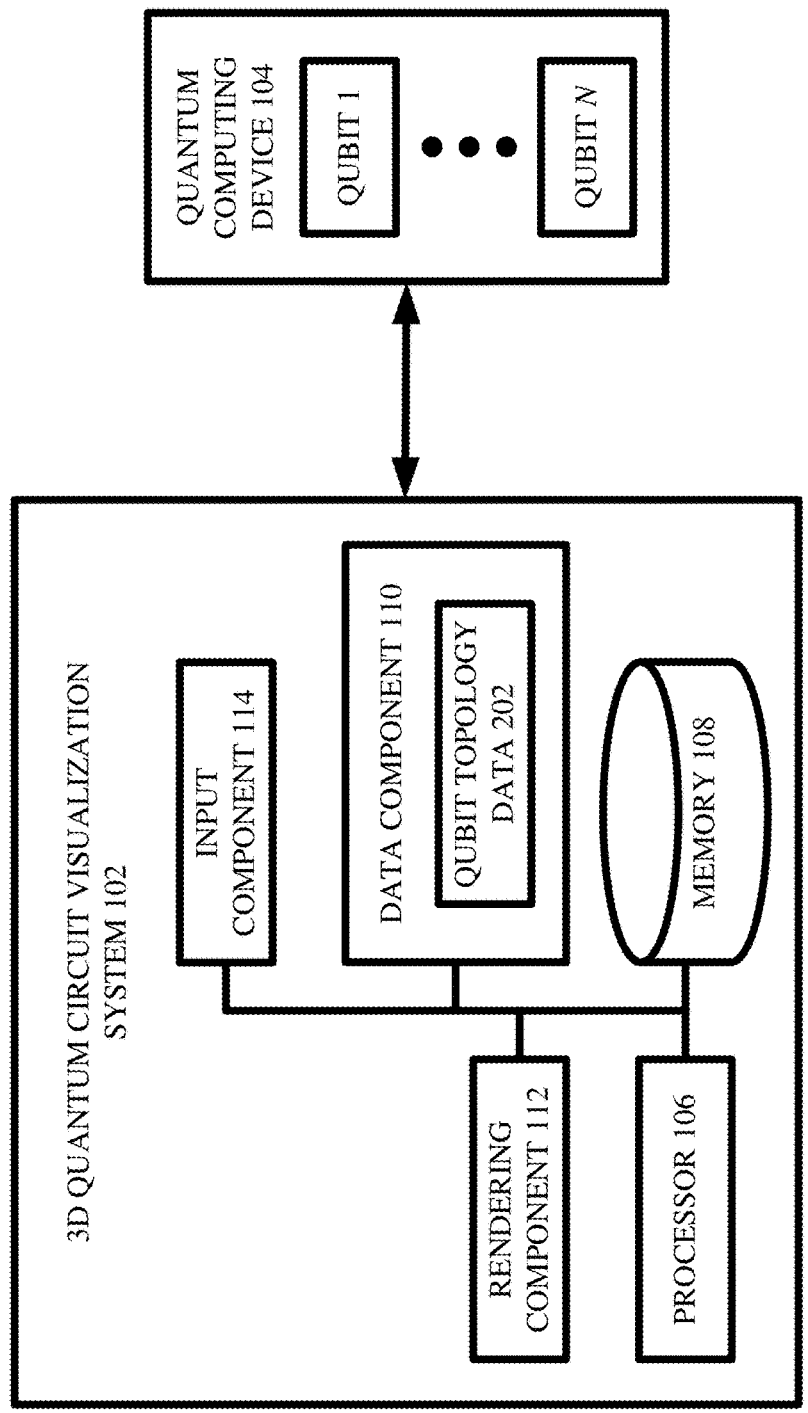
FIG. 2 illustrates a block diagram of an example, non-limiting system including qubit topology data that facilitates electronic generation of three-dimensional quantum circuit diagrams in accordance with one or more embodiments described herein.

FIG. 2 illustrates a block diagram of an example, non-limiting system 200 including qubit topology data that can facilitate electronic generation of three-dimensional quantum circuit diagrams in accordance with one or more embodiments described herein. As shown, the system 200 can, in some cases, comprise the same components as the system 100, and can further comprise qubit topology data 202.

In various aspects, the data component 110 can electronically access the qubit topology data 202 in any suitable fashion. For example, the data component 110 can electronically retrieve the qubit topology data 202 from any suitable data structure that is accessible (e.g., via a wired and/or wireless electronic connection) to the data component 110. As explained above, the qubit topology data 202 can be in any suitable data format, and can indicate the qubit topology of the quantum computing device 104. That is, the qubit topology data 202 can specify which qubits of the quantum computing device 104 are coupled together (e.g., can indicate a qubit connectivity mapping of the quantum computing device 104).

Figure 3:
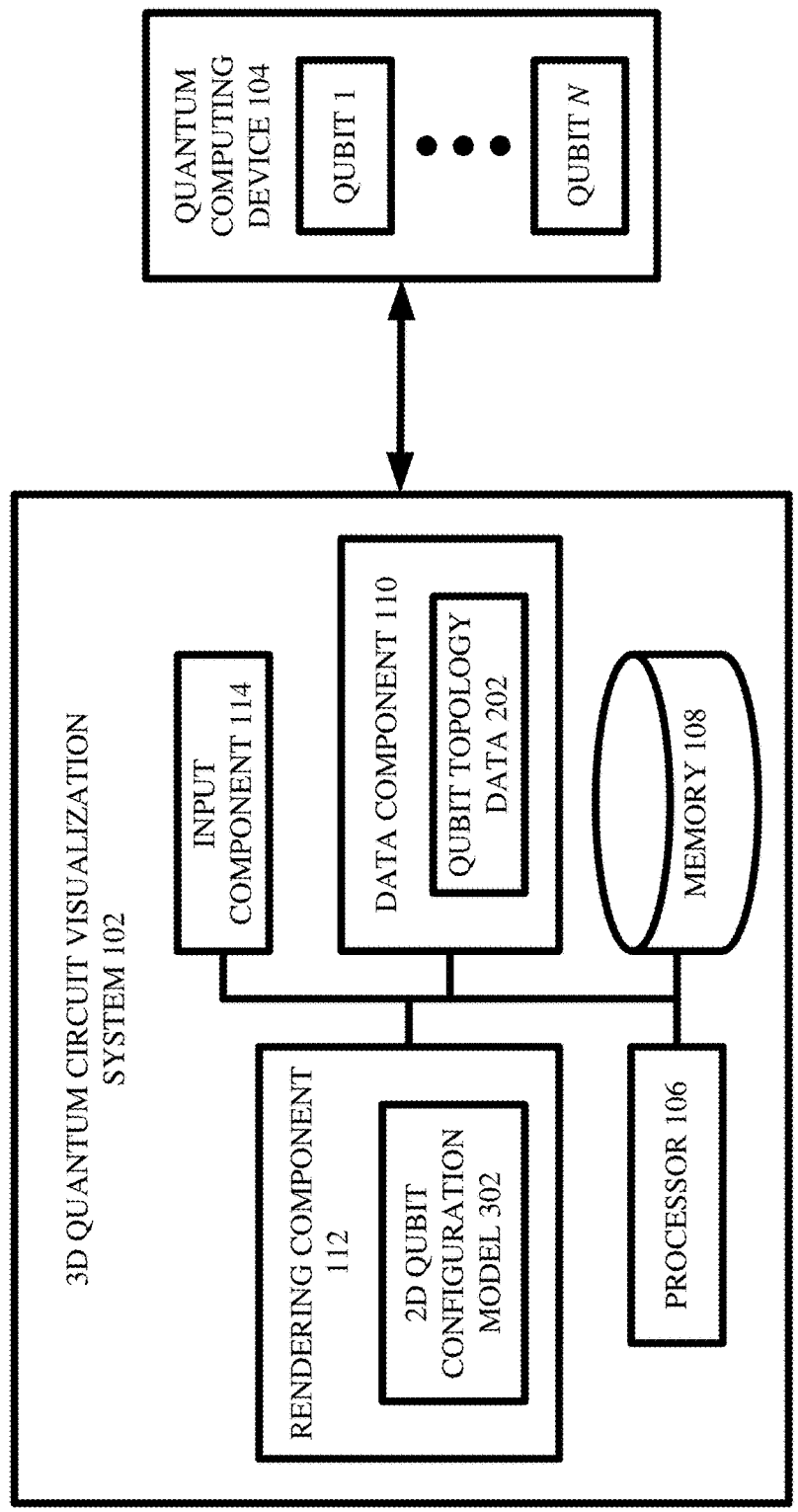
FIG. 3 illustrates a block diagram of an example, non-limiting system including a two-dimensional qubit configuration model that facilitates electronic generation of three-dimensional quantum circuit diagrams in accordance with one or more embodiments described herein.

FIG. 3 illustrates a block diagram of an example, non-limiting system 300 including a two-dimensional qubit configuration model that can facilitate electronic generation of three-dimensional quantum circuit diagrams in accordance with one or more embodiments described herein. As shown, the system 300 can, in some cases, comprise the same components as the system 200, and can further comprise a 2D qubit configuration model 302.

In various aspects, the rendering component 112 can electronically generate the 2D qubit configuration model 302 based on the qubit topology data 202. As explained above, the 2D qubit configuration model 302 can be considered as an electronically rendered pictorial depiction of the qubit topology data 202. For instance, the qubit topology data 202 can specify which qubits of the quantum computing device 104 are coupled together, and the 2D qubit configuration model 302 can include electronically drawn qubit symbols and/or coupler symbols that visually illustrate which qubits of the quantum computing device 104 are coupled together. In other words, the 2D qubit configuration model 302 can be a two-dimensional illustration that depicts which qubits of the quantum computing device 104 are connected.

As mentioned above, the 2D qubit configuration model 302 can, in some cases, be aligned with the physical arrangement of qubits on the quantum computing device 104. That is, the 2D qubit configuration model 302 can be drawn to scale, and/or can otherwise depict qubits and/or couplers as they are actually physically arranged on the quantum computing device 104. In such case, the 2D qubit configuration model 302 can be considered as an aerial view of the set of qubits of the quantum computing device 104. In other cases, the 2D qubit configuration model 302 can be not aligned with the physical arrangement of qubits on the quantum computing device 104. That is, the 2D qubit configuration model 302 can illustrate the topology and/or connectivity of the set of qubits of the quantum computing device 104, but can be not drawn to scale and/or can be not considered as illustrating the qubits and/or couplers as they are actually physically arranged on the quantum computing device 104.

Figure 4:
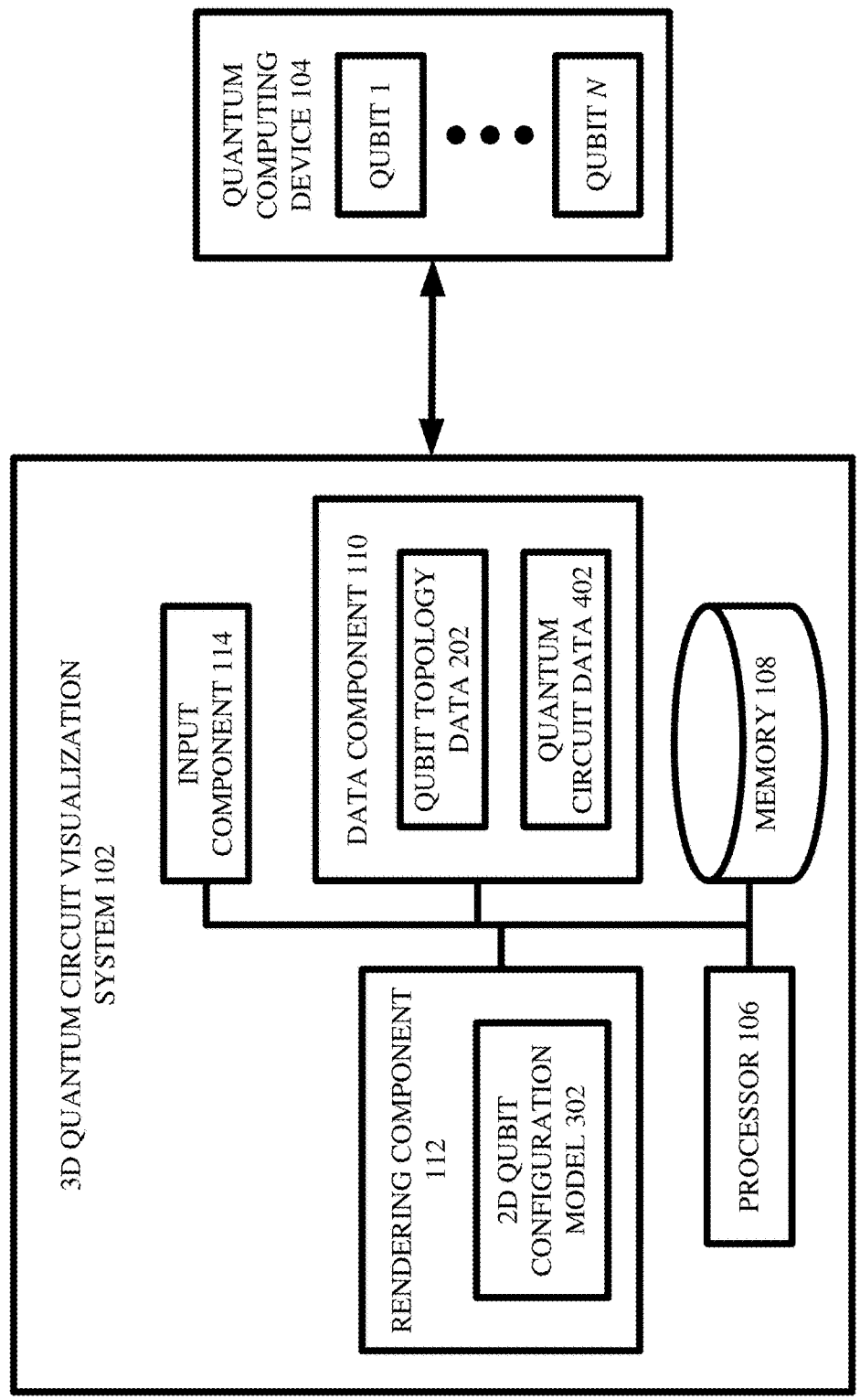
FIG. 4 illustrates a block diagram of an example, non-limiting system including quantum circuit data that facilitates electronic generation of three-dimensional quantum circuit diagrams in accordance with one or more embodiments described herein.

FIG. 4 illustrates a block diagram of an example, non-limiting system 400 including quantum circuit data that can facilitate electronic generation of three-dimensional quantum circuit diagrams in accordance with one or more embodiments described herein. As shown, the system 400 can, in some cases, comprise the same components as the system 300, and can further comprise quantum circuit data 402.

In various aspects, the data component 110 can electronically access the quantum circuit data 402 in any suitable fashion. For example, the data component 110 can electronically retrieve the quantum circuit data 402 from any suitable data structure that is accessible (e.g., via a wired and/or wireless electronic connection) to the data component 110. As explained above, the quantum circuit data 402 can be in any suitable data format, and can identify a quantum circuit that is executable on the quantum computing device 104. That is, the quantum circuit data 402 can specify which quantum gates (e.g., X, Y, Z, H, S, CNOT, TOFF, SWAP) are supposed to be executed on which qubits of the quantum computing device 104, and can also specify the order which such quantum gates are supposed to be executed. As mentioned above, the quantum circuit data 402 can, in some cases, correspond to a conventional two-dimensional quantum circuit diagram.

Figure 5:
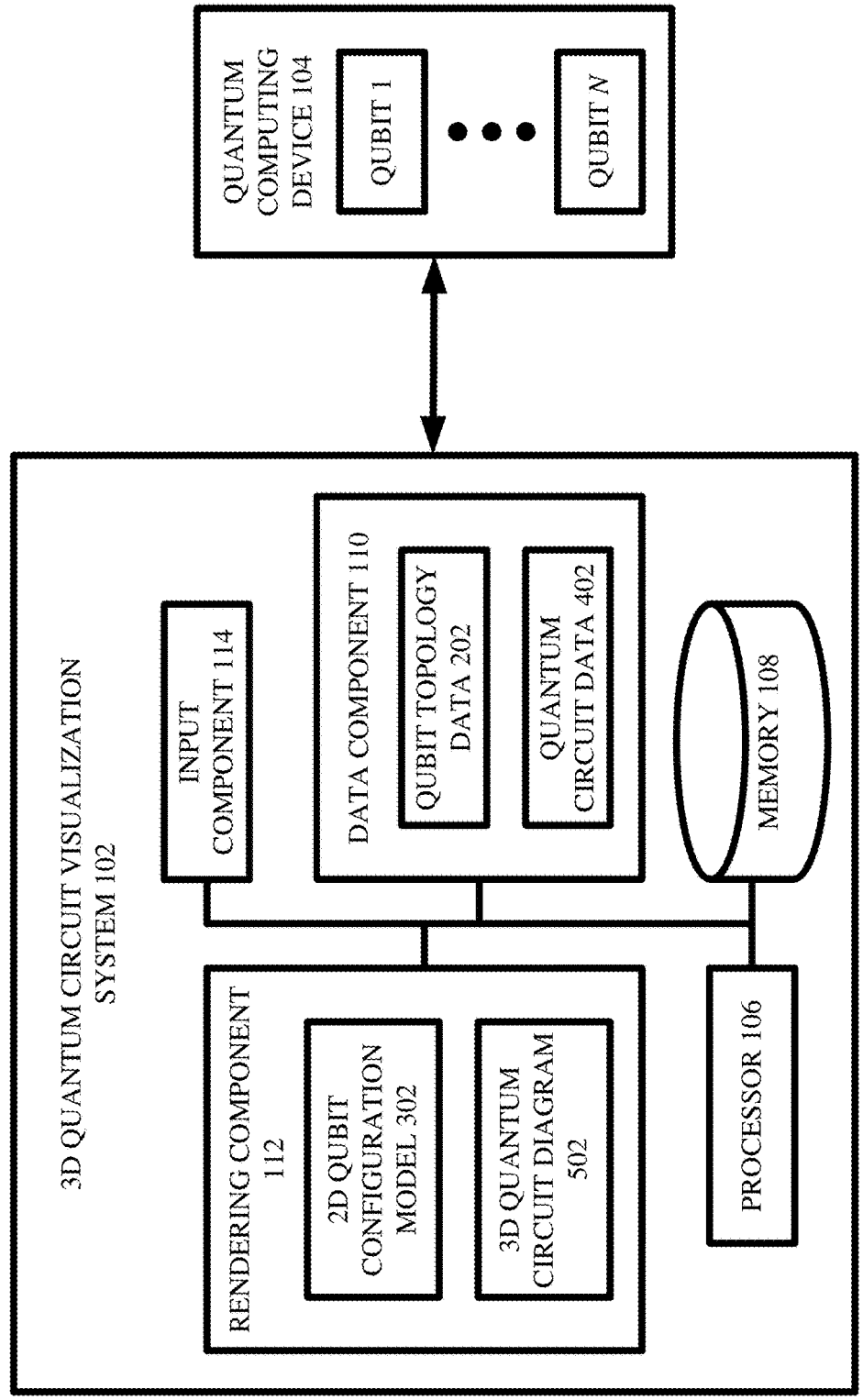
FIG. 5 illustrates a block diagram of an example, non-limiting system including a three-dimensional quantum circuit diagram that facilitates electronic generation of three-dimensional quantum circuit diagrams in accordance with one or more embodiments described herein.

FIG. 5 illustrates a block diagram of an example, non-limiting system 500 including a three-dimensional quantum circuit diagram that can facilitate electronic generation of three-dimensional quantum circuit diagrams in accordance with one or more embodiments described herein. As shown, the system 500 can, in some cases, comprise the same components as the system 400, and can further comprise a 3D quantum circuit diagram 502.

In various aspects, the rendering component 112 can electronically generate the 3D quantum circuit diagram 502 based on the qubit topology data 202 and based on the 2D qubit configuration model 302. As explained above, the rendering component 112 can electronically import the 2D qubit configuration model 302 into a three-dimensional graphing space. In such case, the 2D qubit configuration model 302 can be considered as lying within a plane of the three-dimensional graphing space. In various instances, the rendering component 112 can electronically extrude three-dimensionally outward a qubit line from each symbol representing a qubit in the 2D qubit configuration model 302. That is, the rendering component 112 can electronically draw qubit lines in the three-dimensional graphing space, where such qubit lines extend out of the plane in which the 2D qubit configuration model 302 lies. In some cases, the qubit lines can be orthogonal to the 2D qubit configuration model 302. In other cases, the qubit lines can be non-orthogonal to the 2D qubit configuration model 302 while also being non-parallel with the 2D qubit configuration model 302.

In various aspects, the rendering component 112 can electronically draw symbols representing quantum gates on and/or otherwise along the qubit lines that are three-dimensionally extruded from the 2D qubit configuration model 302, in accordance with the quantum circuit data 402. That is, the quantum circuit data 402 can specify which quantum gates are supposed to be executed on which qubits in which order, and the rendering component 112 can accordingly illustrate quantum gate symbols on the three-dimensionally extruded qubit lines based on such information. The result can be the 3D quantum circuit diagram 502 (e.g., a three-dimensional visualization of a quantum circuit being executed on the quantum computing device 104).

Figure 6:
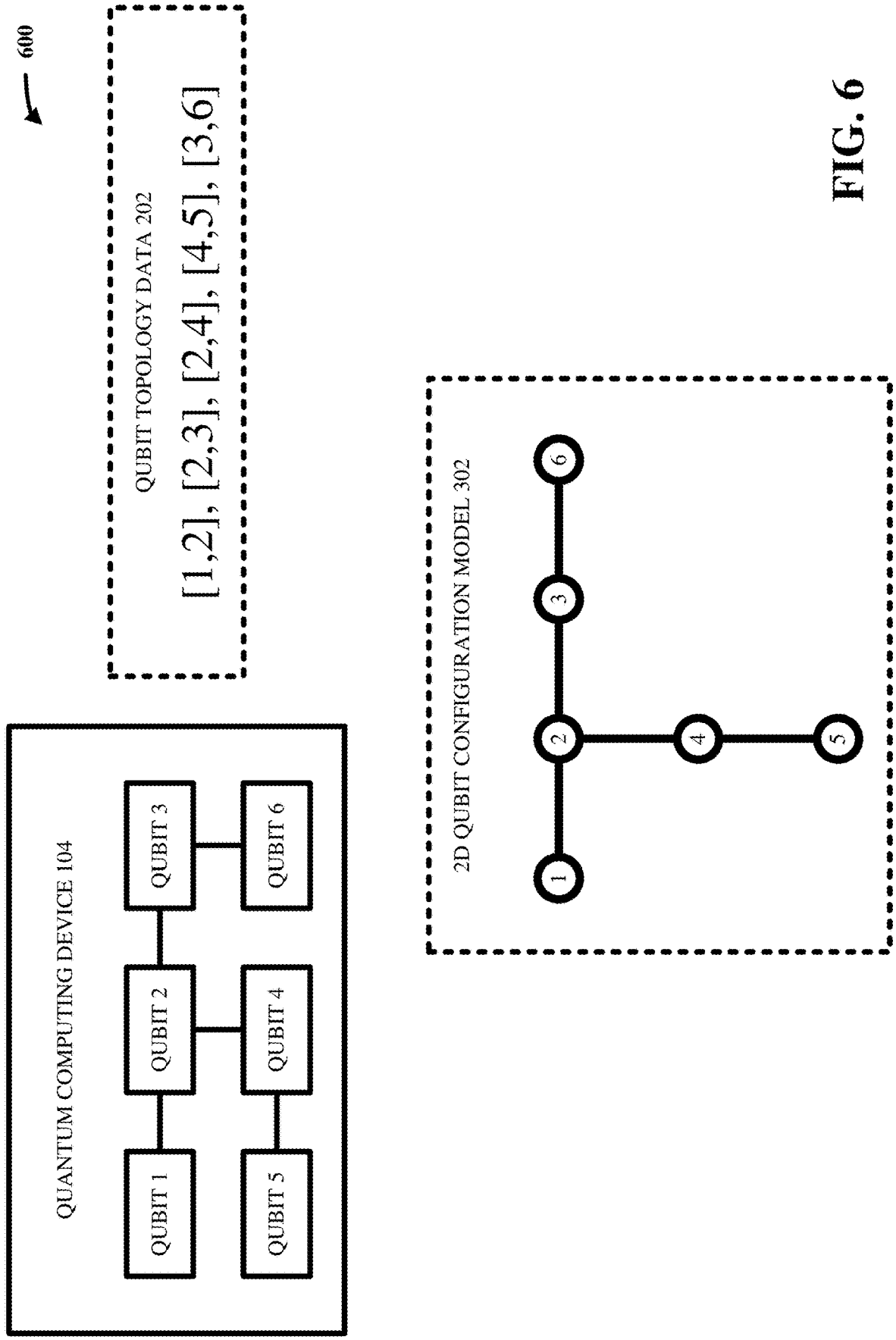
FIG. 6 illustrates an example and non-limiting quantum computing device, example and non-limiting qubit topology data, and an example and non-limiting two-dimensional qubit configuration model in accordance with one or more embodiments described herein.

The above discussion describing FIGS. 2-5 is illustratively clarified by FIGS. 6-9. FIG. 6 illustrates an example and non-limiting quantum computing device, example and non-limiting qubit topology data, and an example and non-limiting two-dimensional qubit configuration model in accordance with one or more embodiments described herein.

As shown, FIG. 6 depicts an example and non-limiting embodiment of the quantum computing device 104. As shown, the quantum computing device 104 can, in some cases, comprise six qubits (e.g., qubit 1, qubit 2, qubit 3, qubit 4, qubit 5, and qubit 6). In various aspects, the six qubits of the quantum computing device 104 can exhibit any suitable physical arrangement on the quantum computing device 104. That is, the six qubits can be physically located and/or physically positioned on the quantum computing device 104 in any suitable fashion and/or pattern. In the example depicted in FIG. 6, the six qubits can be physically arranged as a 2×3 array (e.g., two rows, three columns) of qubits. Those having ordinary skill in the art will appreciate that the 2×3 array of qubits of the quantum computing device 104 is merely a non-limiting example for illustrative purposes. In various aspects, any other suitable physical arrangement of qubits can be implemented (e.g., any other suitable rectilinear arrangement, circular arrangement, triangular arrangement).

In various aspects, the six qubits of the quantum computing device 104 can exhibit any suitable qubit topology and/or connectivity. Those having ordinary skill in the art will appreciate that physical qubit arrangement can be distinct from qubit topology/connectivity. Specifically, physical qubit arrangement can pertain to physical positioning of the qubits, whereas qubit topology/connectivity can pertain to which qubits are coupled together. So, the six qubits can be coupled and/or interconnected in any suitable fashion on the quantum computing device 104. In the example depicted in FIG. 6, the qubit 1 is coupled to the qubit 2, the qubit 2 is coupled to the qubit 3, the qubit 2 is coupled to the qubit 4, the qubit 4 is coupled to the qubit 5, and the qubit 3 is coupled to the qubit 6.

As shown, FIG. 6 depicts an example and non-limiting embodiment of the qubit topology data 202. As shown, the qubit topology data 202 can specify and/or otherwise indicate the qubit topology/connectivity of the quantum computing device 104. As mentioned above, the qubit topology data 202 can take the form of order pairs. In the example shown in FIG. 6, the qubit topology data 202 includes five ordered pairs. Here, the ordered pair [1,2] can indicate that the qubit 1 is coupled to the qubit 2, the ordered pair [2,3] can indicate that the qubit 2 is coupled to the qubit 3, the ordered pair [2,4] can indicate that the qubit 2 is coupled to the qubit 4, the ordered pair [4,5] can indicate that the qubit 4 is coupled to the qubit 5, and the ordered pair [3,6] can indicate that the qubit 3 is coupled to the qubit 6. Thus, the qubit topology data 202 can specify and/or otherwise convey which qubits of the quantum computing device 104 are coupled together.

As shown, FIG. 6 depicts an example and non-limiting embodiment of the 2D qubit configuration model 302. As shown, the 2D qubit configuration model 302 can be a two-dimensional pictorial depiction of the qubit topology data 202. As explained above, the rendering component 112 can electronically draw the 2D qubit configuration model 302 by iterating through each ordered pair that is listed in the qubit topology data 202.

For example, the rendering component 112 can begin with the ordered pair [1,2]. The rendering component 112 has not yet rendered a symbol that represents the qubit 1 and has not yet rendered a symbol that represents the qubit 2. So, the rendering component 112 can render (e.g., in two-space) a symbol representing the qubit 1 (e.g., in FIG. 6, the circle with "1" in it represents the qubit 1) and can render a symbol representing the qubit 2 (e.g., in FIG. 6, the circle with the "2" in it represents the qubit 2). Moreover, the rendering component 112 can render a symbol representing a coupler, and can place such symbol between the symbol representing the qubit 1 and the symbol representing the qubit 2 (e.g., in FIG. 6, the bold line that connects the circle with "1" to the circle with "2" indicates that the qubit 1 is coupled to the qubit 2.

The rendering component 112 can then move on to the next ordered pair, for example [2,3]. The rendering component 112 has already rendered a symbol that represents the qubit 2 but has not yet rendered a symbol that represents the qubit 3. So, the rendering component 112 can render a symbol representing the qubit 3 (e.g., in FIG. 6, the circle with "3" in it represents the qubit 3). Moreover, the rendering component 112 can render a symbol representing a coupler, and can place such symbol between the symbol representing the qubit 2 and the symbol representing the qubit 3 (e.g., in FIG. 6, the bold line that connects the circle with "2" to the circle with "3" indicates that the qubit 2 is coupled to the qubit 3).

The rendering component 112 can then move on to the next ordered pair, for example [2,4]. The rendering component 112 has already rendered a symbol that represents the qubit 2 but has not yet rendered a symbol that represents the qubit 4. So, the rendering component 112 can render a symbol representing the qubit 4 (e.g., in FIG. 6, the circle with "4" in it represents the qubit 4). Moreover, the rendering component 112 can render a symbol representing a coupler, and can place such symbol between the symbol representing the qubit 2 and the symbol representing the qubit 4 (e.g., in FIG. 6, the bold line that connects the circle with "2" to the circle with "4" indicates that the qubit 2 is coupled to the qubit 4).

The rendering component 112 can then move on to the next ordered pair, for example [4,5]. The rendering component 112 has already rendered a symbol that represents the qubit 4 but has not yet rendered a symbol that represents the qubit 5. So, the rendering component 112 can render a symbol representing the qubit 5 (e.g., in FIG. 6, the circle with "5" in it represents the qubit 5). Moreover, the rendering component 112 can render a symbol representing a coupler, and can place such symbol between the symbol representing the qubit 4 and the symbol representing the qubit 5 (e.g., in FIG. 6, the bold line that connects the circle with "4" to the circle with "5" indicates that the qubit 4 is coupled to the qubit 5).

The rendering component 112 can then move on to the next ordered pair, for example [3,6]. The rendering component 112 has already rendered a symbol that represents the qubit 3 but has not yet rendered a symbol that represents the qubit 6. So, the rendering component 112 can render a symbol representing the qubit 6 (e.g., in FIG. 6, the circle with "6" in it represents the qubit 6). Moreover, the rendering component 112 can render a symbol representing a coupler, and can place such symbol between the symbol representing the qubit 3 and the symbol representing the qubit 6 (e.g., in FIG. 6, the bold line that connects the circle with "3" to the circle with "6" indicates that the qubit 3 is coupled to the qubit 6).

Because there are no other ordered pairs listed in the qubit topology data 202 (e.g., at least in this example), the 2D qubit configuration model 302 can be complete.

As shown, the six qubits can be physically arranged on the quantum computing device 104 in the shape of a 2×3 array, but the 2D qubit configuration model 302 can, in various aspects, not be aligned with such physical arrangement. In other words, although the six qubits can be physically arranged in a 2×3 array on the quantum computing device 104, the 2D qubit configuration model 302 can be not shaped as a 2×3 array. Despite this dissimilarity in shape, those having ordinary skill in the art will appreciate that the 2D qubit configuration model 302 is nevertheless topologically equivalent to the 2×3 qubit array of the quantum computing device 104 (e.g., no matter the shape/arrangement, the qubit 1 is coupled to the qubit 2 which is coupled to both the qubit 3 and the qubit 4, the qubit 4 is coupled to the qubit 5, and the qubit 3 is coupled to the qubit 6). In still other words, the 2D qubit configuration model 302 can, in some cases, illustrate the qubit topology/connectivity without mirroring and/or depicting the physical arrangement of qubits on the quantum computing device 104. Those having ordinary skill in the art will appreciate that this is a mere non-limiting example. In various other embodiments, the 2D qubit configuration model 302 can illustrate the qubit topology/connectivity while also mirroring and/or depicting the physical arrangement of qubits on the quantum computing device 104 (e.g., the 2D qubit configuration model 302 can, in some cases, exhibit a shape that matches the physical arrangement of the quantum computing device 104, in this case a 2×3 array).

Figure 7:
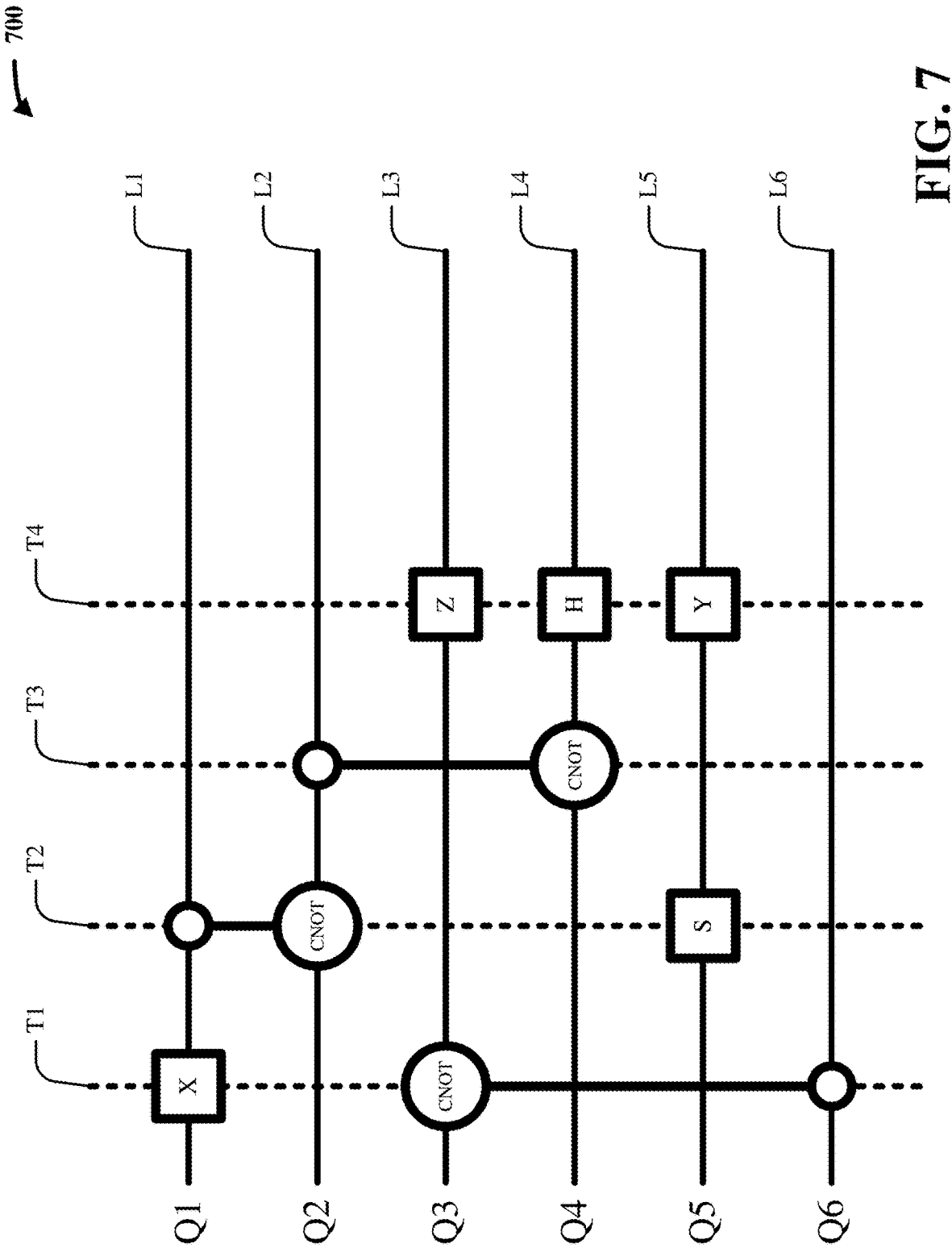
FIG. 7 illustrates example and non-limiting quantum circuit data in accordance with one or more embodiments described herein.

FIG. 7 illustrates example and non-limiting quantum circuit data in accordance with one or more embodiments described herein. In other words, FIG. 7 depicts a non-limiting embodiment of the quantum circuit data 402. Specifically, FIG. 7 illustrates a two-dimensional quantum circuit diagram 700 that is executable on the quantum computing device 104. In various cases, the two-dimensional quantum circuit diagram 700 can be specified, indicated, and/or otherwise conveyed by the quantum circuit data 402.

As shown, the two-dimensional quantum circuit diagram 700 can include on its left-side a column that lists the six qubits of the quantum computing device 104, where Q1 corresponds to qubit 1, Q2 corresponds to qubit 2, Q3 corresponds to qubit 3, Q4 corresponds to qubit 4, Q5 corresponds to qubit 5, and Q6 corresponds to qubit 6. As also shown, for each qubit listed in the column, the two-dimensional quantum circuit diagram 700 can include a qubit line that extends rightward from the qubit. Specifically, the qubit line L1 extends from Q1, the qubit line L2 extends from Q2, the qubit line L3 extends from Q3, the qubit line L4 extends from Q4, the qubit line L5 extends from Q5, and the qubit line L6 extends from Q6.

As explained above, qubit lines can be considered as timelines and/or time axes which can show relative order of execution of quantum gates. In some cases, the two-dimensional quantum circuit diagram 700 can indicate relative order of execution from left to right, such that portions of qubit lines that are leftward occur earlier in time than portions of qubit lines that are rightward. To help illustrate this, the two-dimensional quantum circuit diagram 700 can include time steps T1, T2, T3, and/or T4 at different positions along the qubit lines (e.g., although only four time steps are depicted, this is a non-limiting example; in various cases, any suitable number of time steps can be depicted). As shown, T1 can be leftward of T2, which can be leftward of T3, which can be leftward of T4. Accordingly, this can indicate that T1 can occur before T2, which can occur before T3, which can occur before T4. In various aspects, the time steps can be for illustrative purposes only (e.g., can indicate relative order of execution rather than precise hour/minute/second/microsecond of execution). In various cases, the time steps can be omitted.

As shown, quantum gates can be illustrated on the qubit lines at the various time steps in the two-dimensional quantum circuit diagram 700. In the example shown, a box with an "X" in it is illustrated on L1 at a position corresponding to T1, which can indicate that a Pauli-X gate is supposed to be executed on Q1 at T1. In various cases, a box with an "S" in it is illustrated on L5 at a position corresponding to T2, which can indicate that a Phase gate is supposed to be executed on Q5 at T2. In various aspects, a box with a "Z" in it is illustrated on L3 at a position corresponding to T4, which can indicate that a Pauli-Z gate is supposed to be executed on Q3 at T4. In various instances, a box with a "H" in it is illustrated on L4 at a position corresponding to T4, which can indicate that a Hadamard gate is supposed to be executed on Q4 at T4. As shown, a box with a "Y" in it is illustrated on L5 at a position corresponding to T4, which can indicate that a Pauli-Y gate is supposed to be executed on Q5 at T4. In various cases, a large circle with "CNOT" in it is illustrated on L3 at a position corresponding to T1 and is coupled to a small circle illustrated on L6 at a position corresponding to T1. This can indicate that a CNOT gate is supposed to be executed at T1, with target Q3 and control Q6. In various instances, a large circle with "CNOT" in it is illustrated on L2 at a position corresponding to T2 and is coupled to a small circle illustrated on L1 at a position corresponding to T2. This can indicate that a CNOT gate is supposed to be executed at T2, with target Q2 and control Q1. In various cases, a large circle with "CNOT" in it is illustrated on L4 at a position corresponding to T3 and is coupled to a small circle illustrated on L2 at a position corresponding to T3. This can indicate that a CNOT gate is supposed to be executed at T3, with target Q4 and control Q2. As explained above, the quantum gates at T1 can be executed before those at T2, which can be executed before those at T3, which can be executed before those at T4.

Note that the two-dimensional quantum circuit diagram 700 does not convey any information about the qubit topology/connectivity of the quantum computing device 104. That is, the two-dimensional quantum circuit diagram 700 indicates only which quantum gates are executed on which qubits of the quantum computing device 104 in which order; the two-dimensional quantum circuit diagram 700 does not indicate which qubits of the quantum computing device 104 are coupled together. In some cases, this can lead to confusion.

For instance, as mentioned above, a CNOT gate can be implemented only on coupled qubits. Because the two-dimensional quantum circuit diagram 700 does not convey qubit topology/connectivity, a scientist/engineer that views the two-dimensional quantum circuit diagram 700 may not know which qubits are coupled together, and thus may not know on which qubits a CNOT gate can be executed. In the example shown in the figures, Q1 and Q2 are listed as adjacent to each other in the leftmost column of the two-dimensional quantum circuit diagram 700, and Q1 and Q2 also happen to be coupled together (e.g., as shown in the 2D qubit configuration model 302). Thus, a CNOT gate can be applied to Q1 and Q2 (e.g., shown at T2). However, Q5 and Q6 are also listed as adjacent to each other in the leftmost column of the two-dimensional quantum circuit diagram 700, but Q5 and Q6 are not coupled together (e.g., as shown in the 2D qubit configuration model 302). Thus, even though Q5 and Q6 are listed as adjacent in the two-dimensional quantum circuit diagram 700, they cannot be entangled via a CNOT gate. Relatedly, Q3 and Q6 are not listed as adjacent in the two-dimensional quantum circuit diagram 700, but Q3 and Q6 nevertheless happen to be coupled together (e.g., as shown in the 2D qubit configuration model 302). Thus, Q3 and Q6 can be entangled with a CNOT gate (e.g., shown at T1) despite not being listed as adjacent to each other in the two-dimensional quantum circuit diagram 700. In other words, the two-dimensional quantum circuit diagram 700 conveys a suboptimal amount of information to a viewer.

Figure 8:
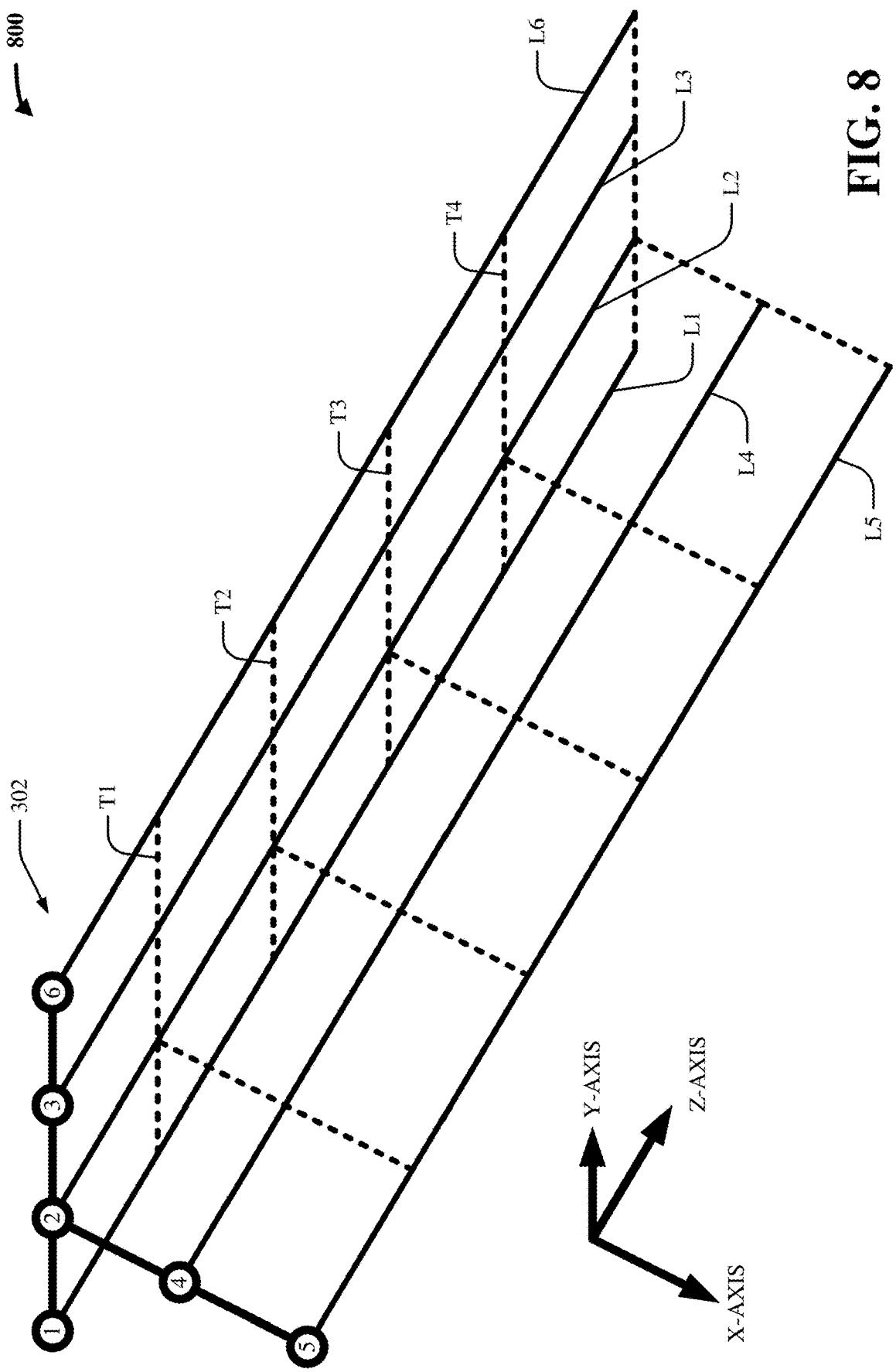
FIG. 8 illustrates an example and non-limiting two-dimensional qubit configuration model imported into three-space in accordance with one or more embodiments described herein.

FIG. 8 illustrates an example and non-limiting two-dimensional qubit configuration model imported into three-space in accordance with one or more embodiments described herein.

As shown and as explained above, the rendering component 112 can, in various aspects, electronically import the 2D qubit configuration model 302 into a three-dimensional graphing space, such that the 2D qubit configuration model 302 lies within a plane of the three-dimensional graphing space. In the example shown, the three-dimensional graphing space can be described by an x-axis, a y-axis, and a z-axis, all of which can be mutually orthogonal as shown in FIG. 8. Those having ordinary skill in the art will appreciate that this is merely a non-limiting example and will understand that the three-dimensional graphing space can be represented and/or defined by any other suitable coordinate system, whether or not the basis axes are mutually orthogonal. In the example shown in FIG. 8, the 2D qubit configuration model 302 can lie within and/or can otherwise be parallel with the x-y plane. In various cases, FIG. 8 can be considered as presenting a perspective view of the 2D qubit configuration model 302.

In some cases, the 2D qubit configuration model 302 can still be two-dimensional notwithstanding that it is electronically rendered within the three-dimensional graphing space. That is, the qubit 1 can still be represented by a two-dimensional circle with a "1" in it, the qubit 2 can still be represented by a two-dimensional circle with a "2" in it, the qubit 3 can still be represented by a two-dimensional circle with a "3" in it, the qubit 4 can still be represented by a two-dimensional circle with a "4" in it, the qubit 5 can still be represented by a two-dimensional circle with a "5" in it, and the qubit 6 can still be represented by a two-dimensional circle with a "6" in it, even in the three-dimensional graphing space.

However, in other cases, those having ordinary skill in the art will appreciate that the 2D qubit configuration model 302 can be illustrated as three-dimensional within the three-dimensional graphing space (e.g., in such case, the 2D qubit configuration model 302 can still be referred to as "2D" and/or "two-dimensional" for ease of description). For example, rather than illustrating a given qubit as a two-dimensional circle, the given qubit can instead be illustrated by a three-dimensional sphere (e.g., and/or any other suitable three-dimensional object). That is, the qubit 1 can be represented by a three-dimensional sphere with a "1" in it, the qubit 2 can be represented by a three-dimensional sphere with a "2" in it, the qubit 3 can be represented by a three-dimensional sphere with a "3" in it, the qubit 4 can be represented by a three-dimensional sphere with a "4" in it, the qubit 5 can be represented by a three-dimensional sphere with a "5" in it, and the qubit 6 can be represented by a three-dimensional sphere with a "6" in it when rendered in the three-dimensional graphing space. In other words, physical depth can, in some cases, be added to the 2D qubit configuration model 302 when the 2D qubit configuration model 302 is imported into the three-dimensional graphing space. In such cases, those having ordinary skill in the art will understand that such illustrations of physical depth do not change the herein described nature of the 2D qubit configuration model 302. Specifically, those having ordinary skill in the art will appreciate that the 2D qubit configuration model 302 can nevertheless lie primarily in a two-dimensional plane (e.g., the x-y plane of FIG. 8) even if a depiction of physical depth is added to the 2D qubit configuration model 302.

As shown, the rendering component 112 can, in some embodiments, electronically extrude qubit lines three-dimensionally outward from the 2D qubit configuration model 302 in the three-dimensional graphing space. Specifically, as shown, L1 can be extruded outward from Q1, L2 can be extruded outward from Q2, L3 can be extruded outward from Q3, L4 can be extruded outward from Q4, L5 can be extruded outward from Q5, and L6 can be extruded outward from Q6. As shown, in some cases, the qubit lines can be extruded along the z-axis, such that the qubit lines are orthogonal to the x-y plane and/or orthogonal to the 2D qubit configuration model 302. In various other cases, the qubit lines can be extruded along any other direction that is not orthogonal to the x-y plane and that is not parallel to the x-y plane.

As shown, the rendering component 112 can, in some aspects, illustrate the time steps T1, T2, T3, and T4 within the three-dimensional graphing space. Whereas the time steps in FIG. 7 are represented by mere dotted lines, the time steps in FIG. 8, as shown, can be represented by dotted shapes that mirror the shape of the 2D qubit configuration model 302. In the example shown, the 2D qubit configuration model 302 has a "T" shape, and so the time steps T1, T2, T3, and T4 can likewise have a "T" shape. As mentioned above, in some cases, the time steps can be omitted and/or not rendered.

Figure 9:
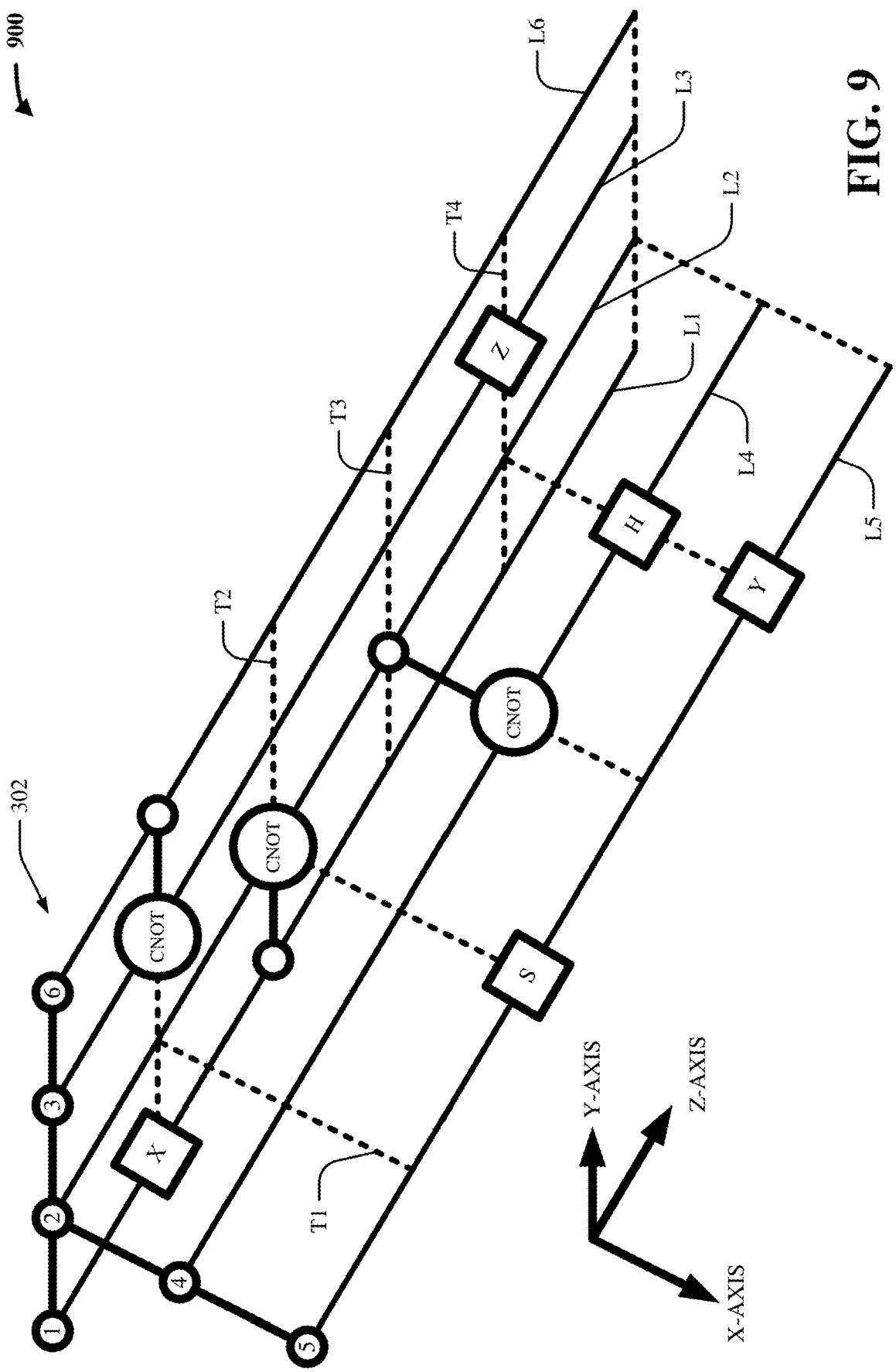
FIG. 9 illustrates an example and non-limiting three-dimensional quantum circuit diagram in accordance with one or more embodiments described herein.

FIG. 9 illustrates an example and non-limiting three-dimensional quantum circuit diagram 900 in accordance with one or more embodiments described herein. In other words, the three-dimensional quantum circuit diagram 900 can be a non-limiting example of the 3D quantum circuit diagram 502. In various cases, the rendering component 112 can electronically render (e.g., on a computerized screen/monitor) the three-dimensional quantum circuit diagram 900 based on the 2D qubit configuration model 302 (e.g., as imported into the three-dimensional graphing space as shown in FIG. 8) and based on the two-dimensional quantum circuit diagram 700. More specifically, the rendering component 112 can electronically generate the three-dimensional quantum circuit diagram 900 by inserting symbols representing quantum gates onto the three-dimensionally extruded qubit lines, in accordance with the two-dimensional quantum circuit diagram 700.

For example, as explained above, the two-dimensional quantum circuit diagram 700 can indicate that a Pauli-X gate is supposed to be executed on Q1 at T1. Accordingly, the rendering component 112 can electronically draw a box/cube (e.g., and/or any other suitable two-dimensional and/or three-dimensional shape) with an "X" in it on L1 at a position corresponding to T1.

Similarly, as explained above, the two-dimensional quantum circuit diagram 700 can indicate that a Phase gate is supposed to be executed on Q5 at T2. Accordingly, the rendering component 112 can electronically draw a box/cube (e.g., and/or any other suitable two-dimensional and/or three-dimensional shape) with an "S" in it on L5 at a position corresponding to T2.

In various cases, as explained above, the two-dimensional quantum circuit diagram 700 can indicate that a Pauli-Z gate is supposed to be executed on Q3 at T4. Accordingly, the rendering component 112 can electronically draw a box/cube (e.g., and/or any other suitable two-dimensional and/or three-dimensional shape) with a "Z" in it on L3 at a position corresponding to T4.

In various instances, as explained above, the two-dimensional quantum circuit diagram 700 can indicate that a Hadamard gate is supposed to be executed on Q4 at T4. Accordingly, the rendering component 112 can electronically draw a box/cube (e.g., and/or any other suitable two-dimensional and/or three-dimensional shape) with an "H" in it on L4 at a position corresponding to T4.

Likewise, as explained above, the two-dimensional quantum circuit diagram 700 can indicate that a Pauli-Y gate is supposed to be executed on Q5 at T4. Accordingly, the rendering component 112 can electronically draw a box/cube (e.g., and/or any other suitable two-dimensional and/or three-dimensional shape) with a "Y" in it on L5 at a position corresponding to T4.

In various aspects, as explained above, the two-dimensional quantum circuit diagram 700 can indicate that a CNOT gate is supposed to be executed at T1 with target Q3 and control Q6. Accordingly, the rendering component 112 can electronically draw a large circle/sphere (e.g., and/or any other suitable two-dimensional and/or three-dimensional shape) with a "CNOT" in it on L3 at a position corresponding to T1 which can be coupled to a small circle/sphere (e.g., and/or any other suitable two-dimensional and/or three-dimensional shape) on L6 at a position corresponding to T1.

In various cases, as explained above, the two-dimensional quantum circuit diagram 700 can indicate that a CNOT gate is supposed to be executed at T2 with target Q2 and control Q1. Accordingly, the rendering component 112 can electronically draw a large circle/sphere (e.g., and/or any other suitable two-dimensional and/or three-dimensional shape) with a "CNOT" in it on L2 at a position corresponding to T2 which can be coupled to a small circle/sphere (e.g., and/or any other suitable two-dimensional and/or three-dimensional shape) on L1 at a position corresponding to T2.

In various instances, as explained above, the two-dimensional quantum circuit diagram 700 can indicate that a CNOT gate is supposed to be executed at T3 with target Q4 and control Q2. Accordingly, the rendering component 112 can electronically draw a large circle/sphere (e.g., and/or any other suitable two-dimensional and/or three-dimensional shape) with a "CNOT" in it on L4 at a position corresponding to T3 which can be coupled to a small circle/sphere (e.g., and/or any other suitable two-dimensional and/or three-dimensional shape) on L2 at a position corresponding to T3.

Those having ordinary skill in the art will appreciate that the particular symbols depicted in FIG. 9 (e.g., squares/cubes and/or circles/spheres with text in them) are non-limiting examples. In various aspects, any other suitable symbols can be used to represent various quantum gates and/or qubits.

In various aspects, the rendering component 112 can be considered as electronically generating a three-dimensional version of the two-dimensional quantum circuit diagram 700. As shown in FIG. 9, the result can be that the three-dimensional quantum circuit diagram 900 visually depicts which quantum gates are to be executed on which qubits in which order (e.g., relative positions T1, T2, T3, T4 along the qubit lines L1, L2, L3, L4, L5, L6 can indicate order of execution). Moreover, as also shown in FIG. 9, the three-dimensional quantum circuit diagram 900 can also visually depict the underlying qubit topology/connectivity of the quantum computing device 104 (e.g., the 2D qubit configuration model 302, which is part of the three-dimensional quantum circuit diagram 900, shows which qubits of the quantum computing device 104 are coupled together and which are not coupled together). This is useful because it allows a viewer to immediately know which qubits can be entangled and which qubits cannot be entangled (e.g., only coupled qubits can be entangled). As shown, the three-dimensional quantum circuit diagram 900 visually conveys much more information than does the two-dimensional quantum circuit diagram 700. In various aspects, the rendering component 112 can electronically render the three-dimensional quantum circuit diagram 900 on a computer screen/monitor.

Figure 10:
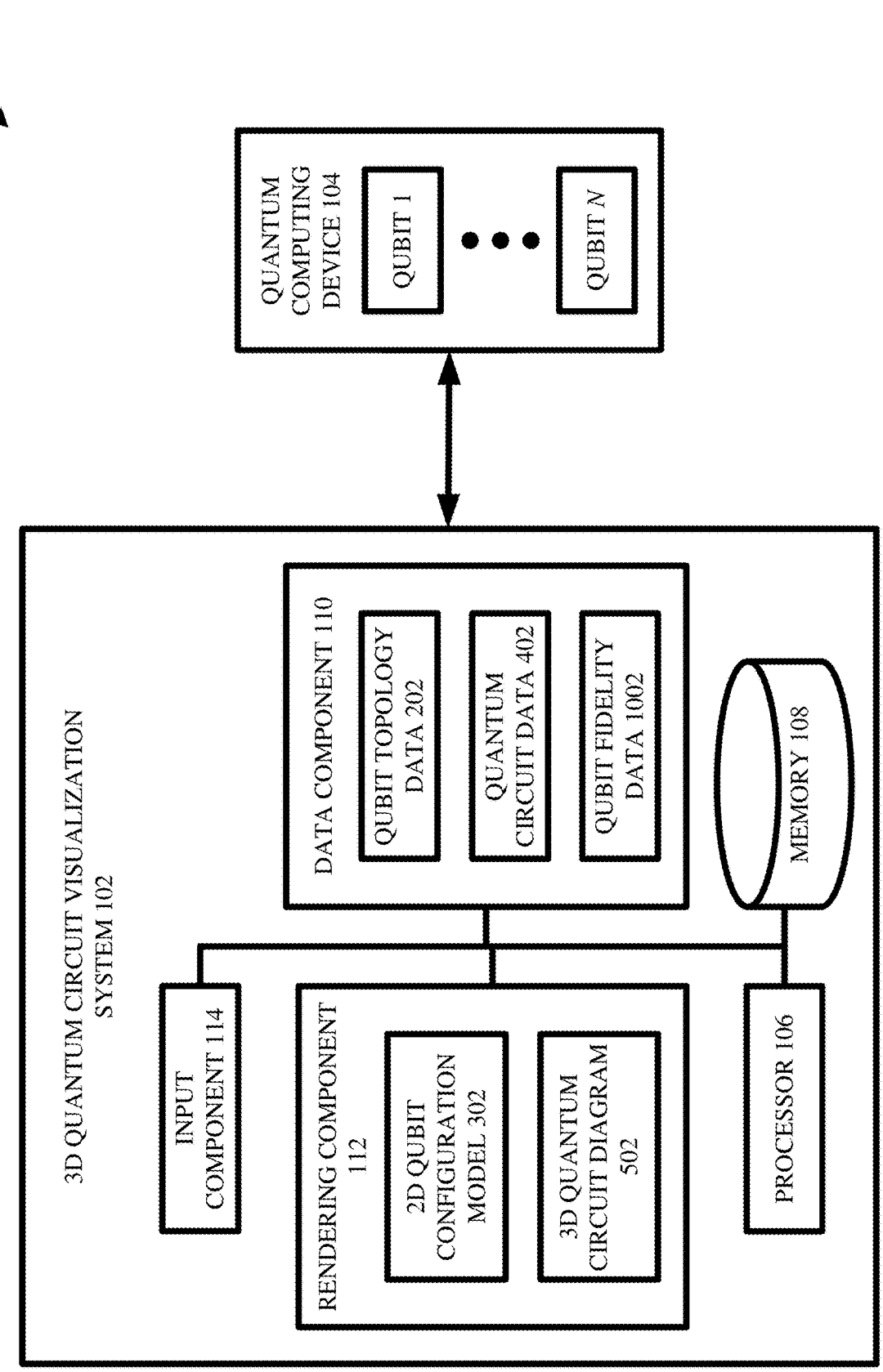
FIG. 10 illustrates a block diagram of an example, non-limiting system including qubit fidelity data that facilitates electronic generation of three-dimensional quantum circuit diagrams in accordance with one or more embodiments described herein.

FIG. 10 illustrates a block diagram of an example, non-limiting system 1000 including qubit fidelity data that can facilitate electronic generation of three-dimensional quantum circuit diagrams in accordance with one or more embodiments described herein. As shown, the system 1000 can, in some cases, comprise the same components as the system 500, and can further comprise qubit fidelity data 1002.

In various aspects, the data component 110 can electronically access the qubit fidelity data 1002 in any suitable fashion. For example, the data component 110 can electronically retrieve the qubit fidelity data 1002 from any suitable data structure that is accessible (e.g., via a wired and/or wireless electronic connection) to the data component 110. As explained above, the qubit fidelity data 1002 can be in any suitable data format, and can indicate the any suitable properties and/or characteristics of the set of qubits of the quantum computing device 104. For instance, the qubit fidelity data 1002 can specify coherence times for each qubit in the set of qubits, can specify operational and/or transition frequencies for each qubit in the set of qubits, can specify readout errors for each qubit in the set of qubits, can specify single-qubit error rates for each qubit in the set of qubits, can specify entangling error rates for each qubit in the set of qubits, and/or can specify any other suitable information pertaining to the set of qubits of the quantum computing device 104.

In various instances, the rendering component 112 can electronically alter (e.g., modulate, change) any visibly-perceptible property of the 3D quantum circuit diagram 502 based on the qubit fidelity data 1002. For example, the rendering component 112 can alter shades/hues of the 3D quantum circuit diagram 502 based on the qubit fidelity data 1002 (e.g., qubits with high error rates can be depicted in red while qubits with low error rates can be depicted in blue). In this way, the depicted shades/hues of the 3D quantum circuit diagram 502 can visually convey some and/or all of the qubit fidelity data 1002. Those having ordinary skill in the art will appreciate that shade/hue is merely a non-limiting example. In various aspects, the rendering component 112 can alter any other visible property of the 3D quantum circuit diagram 502 so as to visually convey some and/or all of the qubit fidelity data 1002 (e.g., can alter font size, can alter symbol shapes, can alter symbol sizes, can alter line thicknesses).

Figure 11:
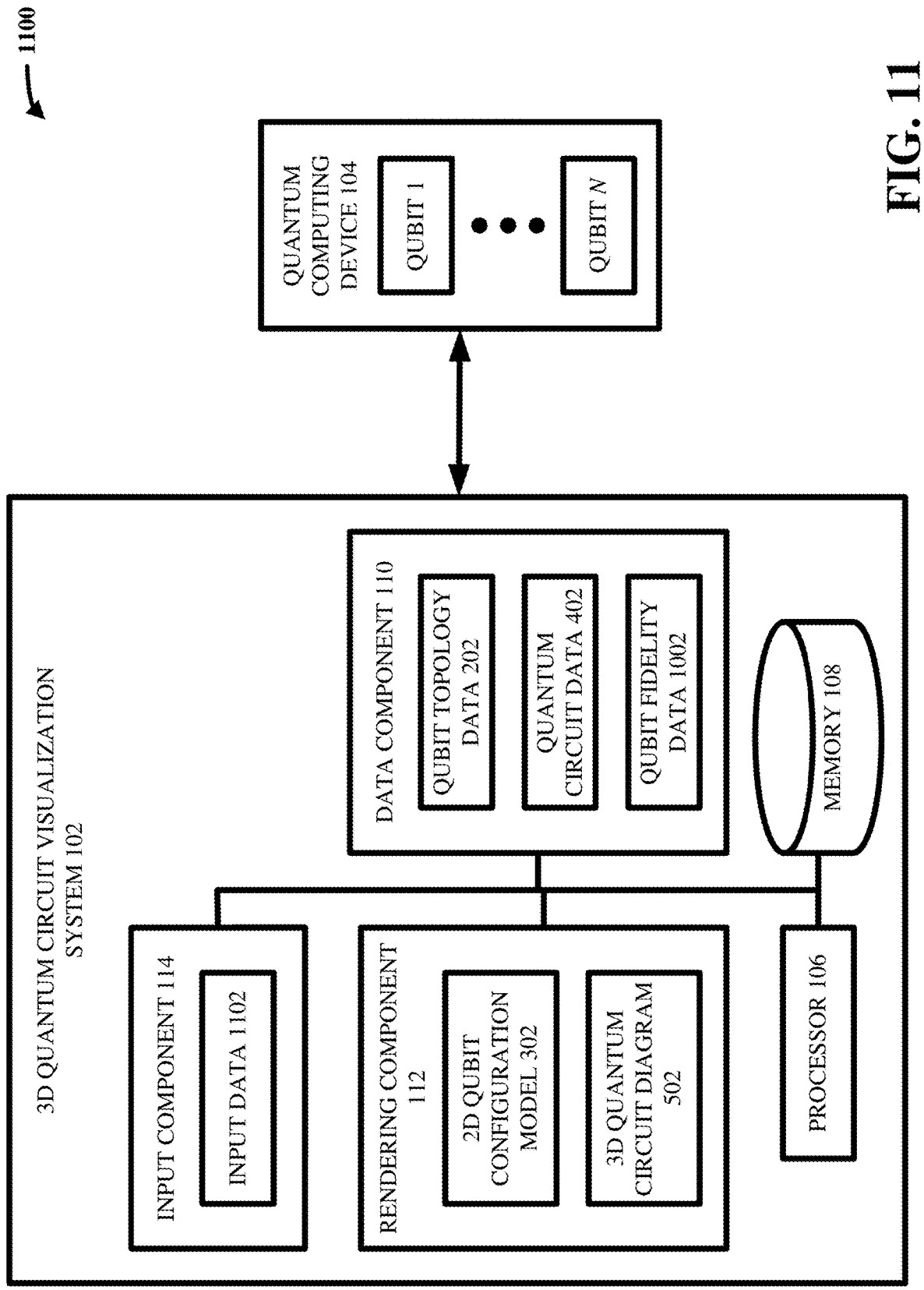
FIG. 11 illustrates a block diagram of an example, non-limiting system including input data that facilitates electronic generation of three-dimensional quantum circuit diagrams in accordance with one or more embodiments described herein.

FIG. 11 illustrates a block diagram of an example, non-limiting system 1100 including input data that can facilitate electronic generation of three-dimensional quantum circuit diagrams in accordance with one or more embodiments described herein. As shown, the system 1100 can, in some cases, comprise the same components as the system 1000, and can further comprise input data 1102.

In various aspects, the input component 114 can electronically receive and/or otherwise electronically access the input data 1102 in any suitable fashion. For example, the input component 114 can electronically retrieve the input data 1102 from any suitable human-interface device (e.g., keyboard, keypad, computer mouse, joystick, voice control) that is operated by a user of the 3DQCV system 102. As another example, the input component 114 can electronically retrieve the input data 1102 from any suitable data structure that is accessible (e.g., via a wired and/or wireless electronic connection) to the input component 114. As explained above, the input data 1102 can be in any suitable data format, and can indicate an orientation and/or a zoom level at which the user of the 3DQCV system 102 desires to view the 3D quantum circuit diagram 502. In various aspects, the rendering component 112 can then alter the orientation and/or zoom level of the 3D quantum circuit diagram 502 based on the input data 1102.

For instance, as explained above, the rendering component 112 can, in some cases, electronically display the three-dimensional quantum circuit diagram 900 on a computer screen/monitor from the orientation and/or zoom level shown in FIG. 9. In various aspects, a user can provide the input data 1102, which can indicate a different three-dimensional orientation and/or different zoom (e.g., magnification) level at which to view the three-dimensional quantum circuit diagram 900. Accordingly, the rendering component 112 can electronically display on the computer screen/monitor the three-dimensional quantum circuit diagram 900 from the desired orientation and/or the desired zoom level. In this way, users of the 3DQCV system 102 can interact with and/or manipulate the 3D quantum circuit diagram 502.

Those having ordinary skill in the art will appreciate the orientation and/or zoom level are mere non-limiting examples. In various cases, any other visible property of the 3D quantum circuit diagram 502 can be altered based on the input data 1102 (e.g., shade/hue, line thickness, translational position, font size, symbol shapes, symbol sizes). Indeed, in some cases, the input data 1102 can specify additional quantum gates that should be added to the 3D quantum circuit diagram 502 and/or can specify quantum gates that should be deleted from the 3D quantum circuit diagram 502. In such cases, the rendering component 112 can alter the 3D quantum circuit diagram 502 accordingly.

Figure 12:
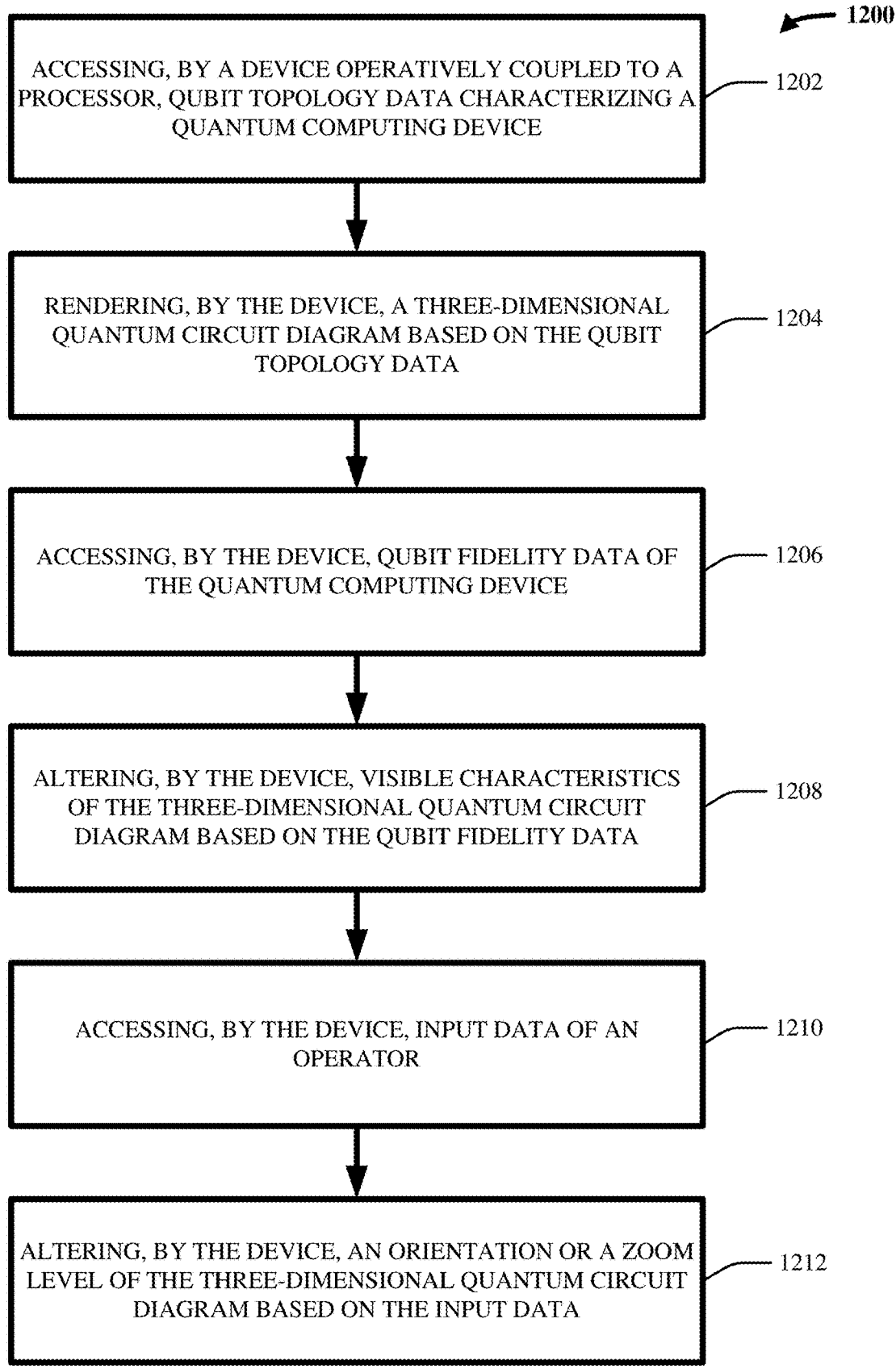
FIGS. 12-13 illustrates flow diagrams of example, non-limiting computer-implemented methods that facilitate electronic generation of three-dimensional quantum circuit diagrams in accordance with one or more embodiments described herein.
Figure 13:
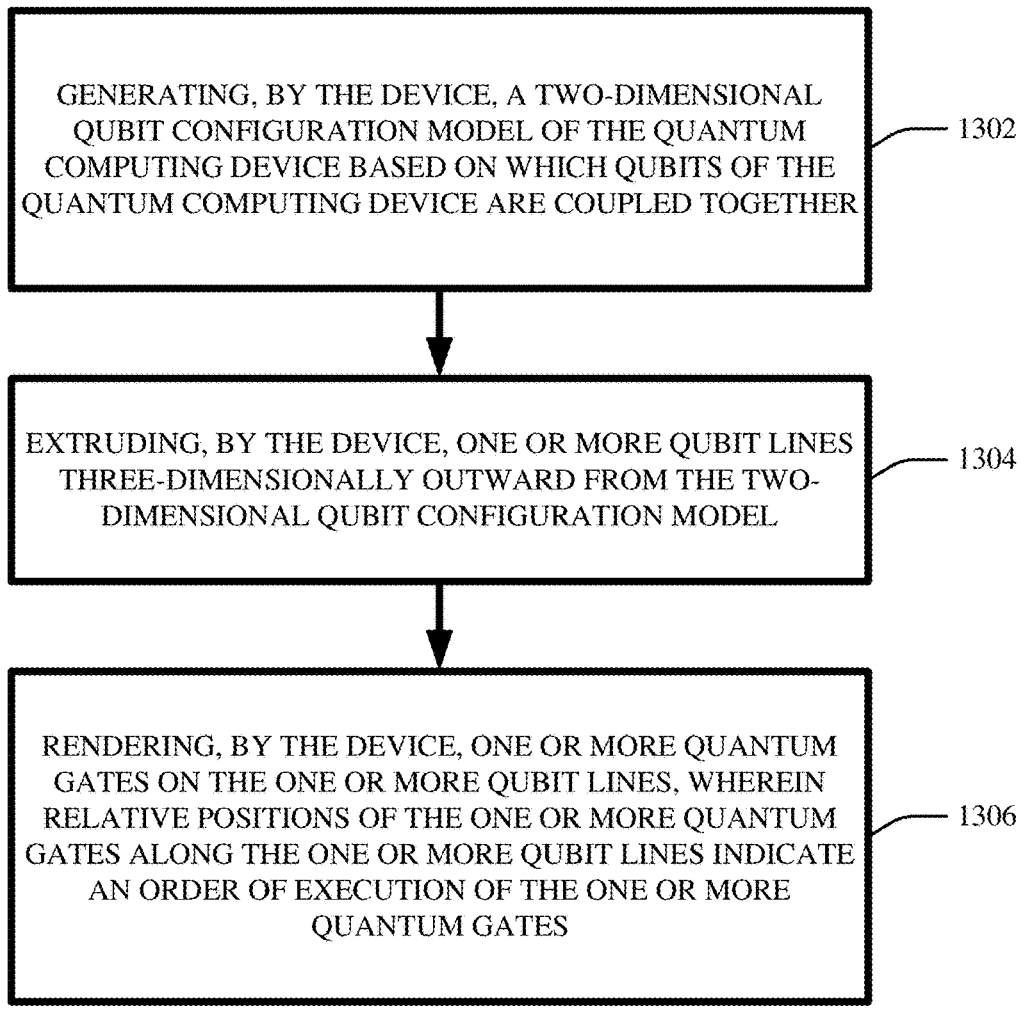

FIGS. 12-13 illustrates flow diagrams of example, non-limiting computer-implemented methods 1200 and 1300 that can facilitate electronic generation of three-dimensional quantum circuit diagrams in accordance with one or more embodiments described herein.

First, consider the computer-implemented method 1200. In various embodiments, act 1202 can include accessing, by a device (e.g., 110) operatively coupled to a processor, qubit topology data (e.g., 202) characterizing a quantum computing device (e.g., 104).

In various aspects, act 1204 can include rendering, by the device (e.g., 112), a three-dimensional quantum circuit diagram (e.g., 502, 900) based on the qubit topology data.

In various instances, act 1206 can include accessing, by the device (e.g., 110), qubit fidelity data (e.g., 1002) of the quantum computing device.

In various cases, act 1208 can include altering, by the device (e.g., 112), visible characteristics of the three-dimensional quantum circuit diagram based on the qubit fidelity data.

In various aspects, act 1210 can include accessing, by the device (e.g., 110), input data (e.g., 1102) of an operator (e.g., a user of the 3DQCV system 102).

In various instances, act 1212 can include altering, by the device (e.g., 112), an orientation or a zoom level of the three-dimensional quantum circuit diagram based on the input data.

Next, consider the computer-implemented method 1300. In various case, the computer-implemented method 1300 can show how the act 1204 of the computer-implemented method 1200 is performed.

In various embodiments, act 1302 can include generating, by the device (e.g., 112), a two-dimensional qubit configuration model (e.g., 302) of the quantum computing device, based on which qubits of the quantum computing device are coupled together.

In various instances, act 1304 can include extruding, by the device (e.g., 112), one or more qubit lines (e.g., L1, L2, L3, L4, L5, L6 in FIGS. 8-9) three-dimensionally outward from the two-dimensional qubit configuration model.

In various cases, act 1306 can include rendering, by the device (e.g., 112), one or more quantum gates (e.g., X, Y, Z, S, H, CNOT as shown in FIG. 9) on the one or more qubit lines. In various aspects, relative positions of the one or more quantum gates along the one or more qubit lines can indicate an order of execution of the one or more quantum gates.

Quantum circuits can be restricted by the underlying device topology (e.g., only qubits that are coupled/connected can be entangled). Conventional quantum circuit diagrams are merely two-dimensional and thus fail to visually convey information about the underlying device topology. Various embodiments of the invention can address this problem by electronically generating three-dimensional quantum circuit diagrams that visually convey topology information in addition to quantum circuit information. An advantage/benefit of various embodiments of the invention is that it can be easier to visually understand how the underlying device topology affects and/or limits quantum circuits. In various aspects, embodiments of the invention can be considered as a graphical user interface that generates three-dimensional visualizations of quantum circuits, so that the underlying device connectivity can be visually perceived. In various instances, users can interact with such a graphical user interface so as to view, manipulate, and/or otherwise explore such three-dimensional visualizations of quantum circuits. Such a graphical user interface certainly constitutes a practical application of computers. Because three-dimensional quantum circuit diagrams as described herein visually convey far more information that conventional two-dimensional quantum circuit diagrams, embodiments of the invention certainly constitute a concrete and tangible technical improvement in the field of quantum circuits diagrams.

Figure 14:
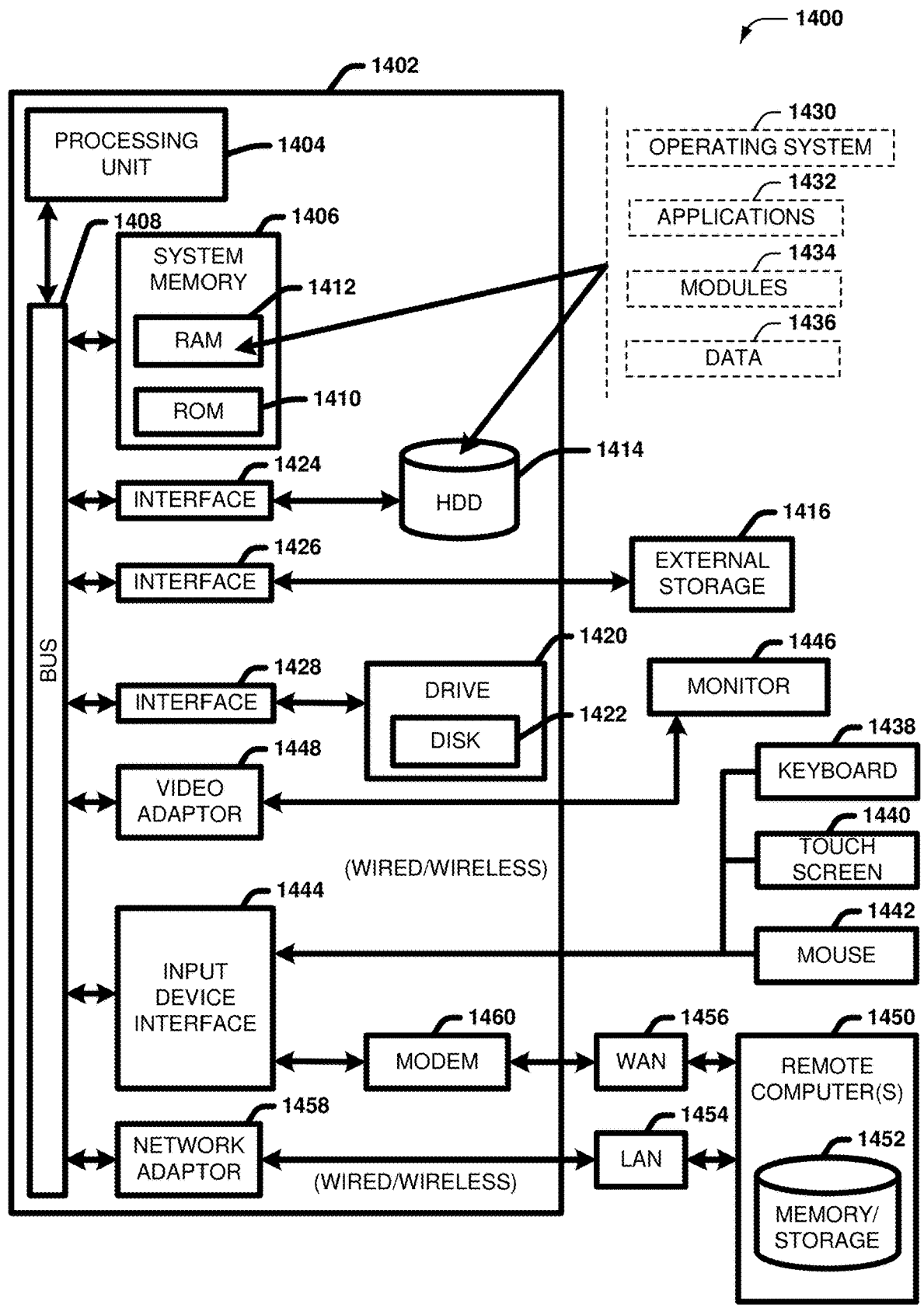
FIG. 14 illustrates a block diagram of an example, non-limiting operating environment in which one or more embodiments described herein can be facilitated.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and a drive 1420, e.g., such as a solid state drive, an optical disk drive, which can read or write from a disk 1422, such as a CD-ROM disc, a DVD, a BD, etc. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
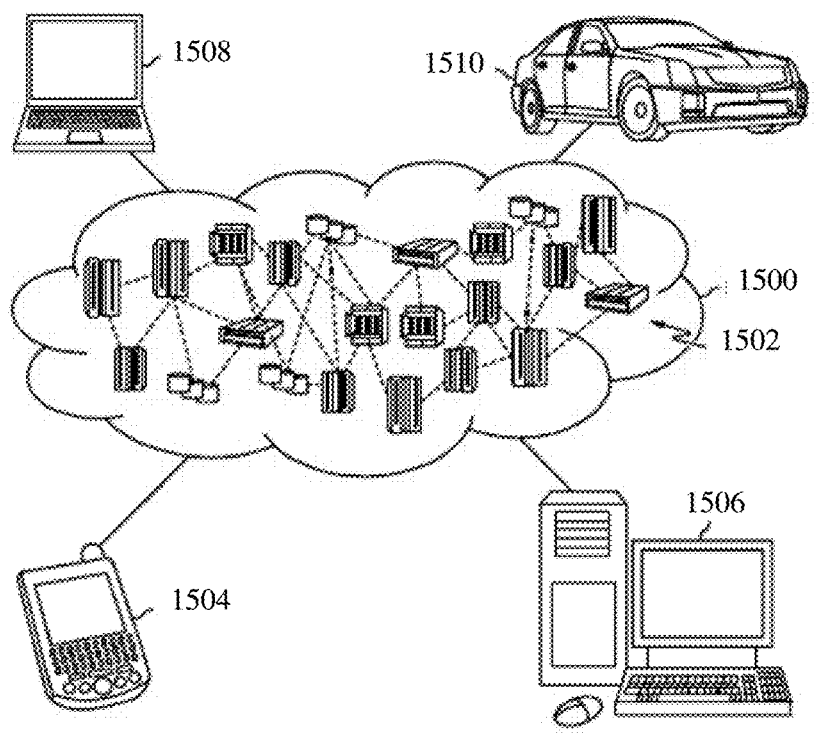
FIG. 15 illustrates an example, non-limiting cloud computing environment in accordance with one or more embodiments described herein.

Referring now to FIG. 15, illustrative cloud computing environment 1500 is depicted. As shown, cloud computing environment 1500 includes one or more cloud computing nodes 1502 with which local computing devices used by cloud consumers, such as, for example, personal digital assistant (PDA) or cellular telephone 1504, desktop computer 1506, laptop computer 1508, and/or automobile computer system 1510 may communicate. Nodes 1502 may communicate with one another. They may be grouped (not shown) physically or virtually, in one or more networks, such as Private, Community, Public, or Hybrid clouds as described hereinabove, or a combination thereof. This allows cloud computing environment 1500 to offer infrastructure, platforms and/or software as services for which a cloud consumer does not need to maintain resources on a local computing device. It is understood that the types of computing devices 1504-1510 shown in FIG. 15 are intended to be illustrative only and that computing nodes 1502 and cloud computing environment 1500 can communicate with any type of computerized device over any type of network and/or network addressable connection (e.g., using a web browser).

Figure 16:
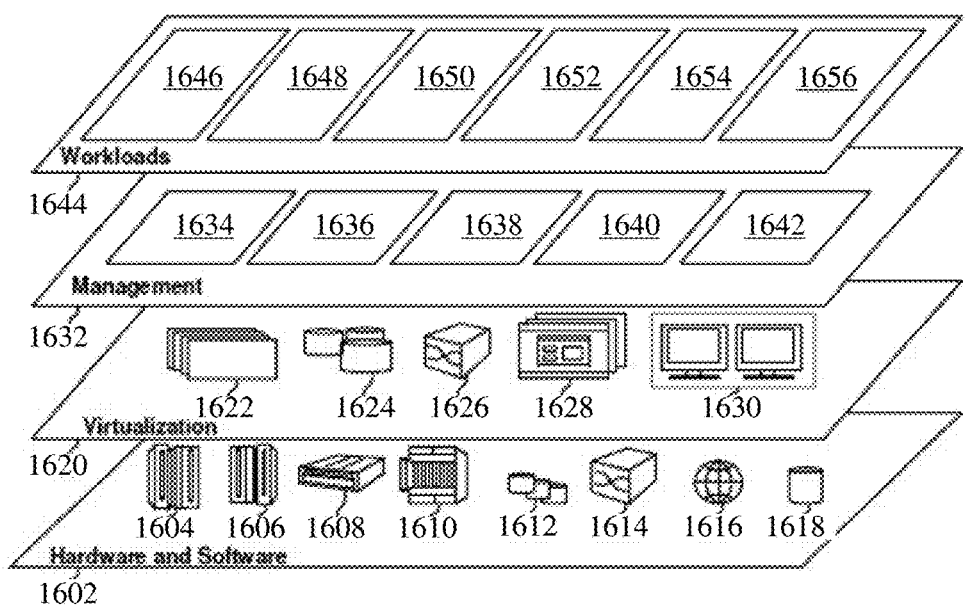
FIG. 16 illustrates example, non-limiting abstraction model layers in accordance with one or more embodiments described herein.

Referring now to FIG. 16, a set of functional abstraction layers provided by cloud computing environment 1500 (FIG. 15) is shown. Repetitive description of like elements employed in other embodiments described herein is omitted for sake of brevity. It should be understood in advance that the components, layers, and functions shown in FIG. 16 are intended to be illustrative only and embodiments of the invention are not limited thereto. As depicted, the following layers and corresponding functions are provided.

Hardware and software layer 1602 includes hardware and software components. Examples of hardware components include: mainframes 1604; RISC (Reduced Instruction Set Computer) architecture based servers 1606; servers 1608; blade servers 1610; storage devices 1612; and networks and networking components 1614. In some embodiments, software components include network application server software 1616 and database software 1618.

Virtualization layer 1620 provides an abstraction layer from which the following examples of virtual entities may be provided: virtual servers 1622; virtual storage 1624; virtual networks 1626, including virtual private networks; virtual applications and operating systems 1628; and virtual clients 1630.

In one example, management layer 1632 may provide the functions described below. Resource provisioning 1634 provides dynamic procurement of computing resources and other resources that are utilized to perform tasks within the cloud computing environment. Metering and Pricing 1636 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1638 provides access to the cloud computing environment for consumers and system administrators. Service level management 1640 provides cloud computing resource allocation and management such that required service levels are met. Service Level Agreement (SLA) planning and fulfillment 1642 provide pre-arrangement for, and procurement of, cloud computing resources for which a future requirement is anticipated in accordance with an SLA.

Workloads layer 1644 provides examples of functionality for which the cloud computing environment may be utilized. Examples of workloads and functions which may be provided from this layer include: mapping and navigation 1646; software development and lifecycle management 1648; virtual classroom education delivery 1650; data analytics processing 1652; transaction processing 1654; and differentially private federated learning processing 1656. Various embodiments of the present invention can utilize the cloud computing environment described with reference to FIGS. 15 and 16 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in a computer-readable memory, the computer-executable components comprising:
   a data component that accesses qubit topology data characterizing a quantum computing device; and
   a rendering component that renders a three-dimensional quantum circuit diagram based on the qubit topology data, and renders the three-dimensional quantum circuit diagram by extruding one or more qubit lines three-dimensionally outward from a two-dimensional qubit configuration model.

2. The system of claim 1, wherein the qubit topology data indicates which qubits of the quantum computing device are coupled together.

3. The system of claim 2, wherein the rendering component renders the three-dimensional quantum circuit diagram by generating the two-dimensional qubit configuration model of the quantum computing device based on which qubits of the quantum computing device are coupled together.

4. The system of claim 3, wherein the two-dimensional qubit configuration model depicts a physical arrangement of qubits of the quantum computing device.

5. The system of claim 1, wherein the rendering component further renders the three-dimensional quantum circuit diagram by rendering one or more quantum gates on the one or more qubit lines, wherein relative positions of the one or more quantum gates along the one or more qubit lines indicate an order of execution of the one or more quantum gates.

6. The system of claim 1, wherein the data component further accesses qubit fidelity data of the quantum computing device, and wherein the rendering component alters visible characteristics of the three-dimensional quantum circuit diagram based on the qubit fidelity data.

7. The system of claim 1, further comprising:
   an input component that accesses input data of an operator, wherein the rendering component alters an orientation or a zoom level of the three-dimensional quantum circuit diagram based on the input data.

8. A computer-implemented method, comprising:
   accessing, by a device operatively coupled to a processor, qubit topology data characterizing a quantum computing device;
   rendering, by the device, a three-dimensional quantum circuit diagram based on the qubit topology data; and
   extruding, by the device, one or more qubit lines three-dimensionally outward from a two-dimensional qubit configuration model.

9. The computer-implemented method of claim 8, wherein the qubit topology data indicates which qubits of the quantum computing device are coupled together.

10. The computer-implemented method of claim 9, wherein the rendering the three-dimensional quantum circuit diagram further comprises:
    generating, by the device, the two-dimensional qubit configuration model of the quantum computing device based on which qubits of the quantum computing device are coupled together.

11. The computer-implemented method of claim 10, wherein the two-dimensional qubit configuration model depicts a physical arrangement of qubits of the quantum computing device.

12. The computer-implemented method of claim 8, wherein the rendering the three-dimensional quantum circuit diagram further comprises:
   rendering, by the device, one or more quantum gates on the one or more qubit lines, wherein relative positions of the one or more quantum gates along the one or more qubit lines indicate an order of execution of the one or more quantum gates.

13. The computer-implemented method of claim 8, further comprising:
   accessing, by the device, qubit fidelity data of the quantum computing device; and
   altering, by the device, visible characteristics of the three-dimensional quantum circuit diagram based on the qubit fidelity data.

14. The computer-implemented method of claim 8, further comprising:
   accessing, by the device, input data of an operator; and
   altering, by the device, an orientation or a zoom level of the three-dimensional quantum circuit diagram based on the input data.

15. A computer program product for facilitating electronic generation of three-dimensional quantum circuit diagrams, the computer program product comprising a non-transitory computer readable memory having program instructions embodied therewith, the program instructions executable by a processor to cause the processor to:
   access, by the processor, qubit topology data characterizing a quantum computing device; and
   render, by the processor, a three-dimensional quantum circuit diagram based on the qubit topology data by extruding one or more qubit lines three-dimensionally outward from a two-dimensional qubit configuration model.

16. The computer program product of claim 15, wherein the qubit topology data indicates which qubits of the quantum computing device are coupled together.

17. The computer program product of claim 16, wherein the processor renders the three-dimensional quantum circuit diagram by also generating, by the processor, the two-dimensional qubit configuration model of the quantum computing device based on which qubits of the quantum computing device are coupled together.

* * * * *